(12) United States Patent
Matsumoto et al.

(10) Patent No.: US 6,272,332 B1
(45) Date of Patent: *Aug. 7, 2001

(54) INFORMATION PRESENTATION SYSTEM AND PORTABLE TELEPHONE APPARATUS WITH INFORMATION DISPLAYING FUNCTION

(75) Inventors: Kanya Matsumoto; Yoshiharu Ueki, both of Tokyo-to; Shozaburo Sakaguchi; Masahiro Sui, both of Kawagoe, all of (JP)

(73) Assignee: Pioneer Electronic Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/897,033

(22) Filed: Jul. 18, 1997

(30) Foreign Application Priority Data

Jul. 19, 1996 (JP) .................................................. 08-191101
Aug. 7, 1996 (JP) .................................................. 08-208672
Sep. 9, 1996 (JP) .................................................. 08-261328

(51) Int. Cl.[7] ........................... H04M 11/10; H04M 3/42
(52) U.S. Cl. ......................... 455/412; 455/414; 455/566; 340/825.44
(58) Field of Search ........................... 455/88, 38.1, 422, 455/412, 418, 414, 566, 38.4, 31.3, 466, 426; 340/825.44, 825.5

(56) References Cited

U.S. PATENT DOCUMENTS

| | | | |
|---|---|---|---|
| 4,473,824 | 9/1984 | Claytor | 340/825.27 |
| 5,045,848 | 9/1991 | Fascenda | 340/825.26 |
| 5,303,393 | 4/1994 | Noreen et al. | 455/3.2 |
| 5,463,382 | * 10/1995 | Nikas et al. | 340/825.44 |
| 5,555,446 | * 9/1996 | Jasinski | 455/88 |
| 5,694,455 | * 12/1997 | Goodman | 455/422 |
| 5,708,781 | * 1/1998 | Chiashi et al. | 395/200.17 |
| 5,793,301 | 8/1998 | Patterson, Jr. et al. | 340/825.26 |
| 5,809,415 | * 9/1998 | Rossmann | 455/422 |
| 5,838,252 | * 11/1998 | Kikinis | 340/825.44 |
| 5,870,030 | * 2/1999 | DeLuca et al. | 340/825.44 |
| 5,973,680 | * 10/1999 | Ueda | 345/327 |
| 6,133,853 | * 7/1998 | Obradovich et al. | 340/905 |

FOREIGN PATENT DOCUMENTS

| | | |
|---|---|---|
| 0 537 756 A2 | 4/1993 | (EP) . |
| 6-350733 | 12/1994 | (JP) . |
| WO 95/24808 | 9/1995 | (WO) . |

* cited by examiner

*Primary Examiner*—Vivian Chang
*Assistant Examiner*—Duc Nguyen
(74) *Attorney, Agent, or Firm*—Morgan, Lewis & Bockius LLP

(57) ABSTRACT

An information presentation system is provided with: a data server for providing a predetermined kind of information data classified into a plurality of preset data groups through a communication line; and a portable communication terminal apparatus connectable through the communication line to the data server. The portable communication terminal apparatus is provided with: a connecting device for connecting the portable communication terminal apparatus to the data server through the communication line; an input device for inputting or specifying a desirable code from among a plurality of data group codes each indicating respective one of the preset data groups; and a terminal side transmitting device for transmitting the inputted or specified code through the communication line to the data server. The data server is provided with: a server side receiving device for receiving the transmitted code; and a server side transmitting device for transmitting the information data as for the data group corresponding to the received code by a predetermined format from the data server to the portable communication terminal apparatus through the communication line. The portable communication terminal apparatus is further provided with: a terminal side receiving device for receiving the transmitted information data; and a displaying device for displaying the received information data.

16 Claims, 15 Drawing Sheets

FIG.16

| TEL.No. | IMAGE INFORMATION |
|---|---|
| ○○-○○ | ‥‥‥ |
| □□-□□ | ‥‥‥ |
| ⋮ | ⋮ |
| △△-△△ | ‥‥‥ |

32a

INFORMATION PRESENTATION SYSTEM AND PORTABLE TELEPHONE APPARATUS WITH INFORMATION DISPLAYING FUNCTION

BACKGROUND OF THE INVENTION

1. Field of the Invention

The present invention relates to an information presentation system and a portable telephone apparatus for providing various information data, such as stock information data, sport information data, map information data and the like, by using a communication line such as a telephone line or the like.

2. Description of the Related Art

Recently, an information presentation system, in which various information presentation companies give various information, such as stock information, sport information, map information and the like, through telephone lines to clients and the like, is constituted such that current information can be heard by voice or can be displayed on a display device etc., by dialing a particular telephone number.

A first example of such an information presentation system using a telephone line is a system in which a stock securities company or an information presentation company gives, by voice, current or real time stock prices to a client and the like through a telephone.

In case of the stock information presentation system, a particular telephone number is assigned for each industry division, such as a construction division, a food division, an electrical apparatus division, and the like. For example, when a user dials a telephone number assigned to the electrical apparatus division, the user can hear a voice broadcast read out in an order of predetermined stock codes for respective companies together with a dairy return (increase or decrease against a stock price of a previous day) in such a way that, in the most recent stock prices of listed companies belonging to the electrical apparatus division, TOSHIBA is ○○ (YEN)/○○ (YEN) higher, MITSUBISHIDENKI is ○○ (YEN)/○○ (YEN) higher, FUJIDENKI is ○○ (YEN)/○○ (YEN) higher, and the like. Here, the stock codes for respective companies are codes, each of which is set in advance in a stock industry for each listed company. For example, in the construction division, codes from a 1800 level to a 1900 level are set in such a way that a code of TAISEIKENSETSU is 1801, a code of OBAYASHIGUMI is 1802 and the like. In the electrical apparatus division, codes from a 6500 level to a 6900 level are set in such a way that a code of HITACHISEI-SAKUSHO is 6501, a code of TOSHIBA is 6502 and the like. In the stock industry, the stock transactions are performed, and the stock information data are treated, on the basis of the stock codes set in this manner. In general, such stock codes for respective companies are often seen in a newspaper dedicated to a stock, a magazine dedicated to a stock and the like.

Thus, when a user desires to know a stock price about a particular company, by dialing the telephone number assigned to the industry division to which this particular company belongs, the user can hear the stock price at a time point when the order of this particular company comes in the reading sequence. Presently, the number of the companies is 123, which belong to the electrical apparatus division on the first section of the Tokyo Stock Exchange Market. In this division, the stock price information for each company can be heard through the above mentioned stock information presentation system, approximately every 4 minutes as one cycle.

A second example is a system in which a sport related company and an information presentation system gives to a client and the like through a telephone, by voice, current or real time sport information (various items, such as a competition card scheduled on that day, a result of a game held on that day, information as for the game currently in progress at that time).

In a case of the sport information presentation system, a particular telephone number is assigned to each of sport genres, such as a baseball, a horse race, a golf, a SUMO wrestling and the like. Thus, when a user desires to know the sport information about a particular item in a particular sport genre, by dialing the telephone number assigned to this sport genre, the user can hear the sport information about this item at a time point when the order of this item comes in the reading sequence.

A third example of such an information presentation system using a telephone line is a system in which an information presentation company gives map information.

Recently, a retrieving or searching function is extremely enriched in a navigation apparatus represented by a car navigation apparatus for displaying map data and the like in the vicinity of a current position of a car. Hence, a navigation apparatus is developed which has a function of displaying map data of a territory corresponding to a telephone number if inputting the telephone number to the navigation apparatus. In order to implement such a retrieving function, a maker of the navigation apparatus has a huge amount of retrieval database, and suitably edits and prepares various map data and the like based on the retrieval database to thereby provide it in a form of CD-ROM and the like to memory devices of the respective navigation apparatuses.

In the third example of the information presentation system, a portable telephone can be constituted such that it has a small type of a displaying device such as an LCD (liquid crystal display device) to display the map data thereon. However, it is virtually impossible to provide such a portable telephone with the database concerned in a widely ranging map which can be retrieved or searched by inputting a telephone number as mentioned above, because of the constraint of a hardware such as a memory and the like, since portability such as smallness and lightness is essentially important. Therefore, Japanese Patent Application Laying Open (KOKAI) Hei. No. 6-350733 proposes a portable telephone navigation system, in which each of basic stations, which are located at intervals of approximately 100 meters in a town so as to communicate with the portable telephone apparatuses, stores the map data as for the map at the vicinity of the respective basic station, and, if a user indicates a map request from one portable telephone apparatus, the basic station communicating with this portable telephone apparatus sends the stored map data to the portable telephone apparatus, so that the portable telephone apparatus receives and displays it. According to this system, each of the basic stations may have an enough memory to store the map at the vicinity of the respective basic station. Hence, the portable telephone apparatus can automatically obtain the map data as for the map at the vicinity of the pertinent portable telephone apparatus, by indicating the map request.

However, there are various problems in the above explained first to third examples of the information presentation system as followings.

In the first example as explained above, the stock information through the voice broadcast in the above described first example is always continued to be supplied in the order of the stock codes during the market quotation. Thus, this results in a problem that, even when the user desires to know the stock information about a particular company, the user must wait for several minutes while hearing unnecessary information about companies other than the particular company based on the timing at which the user telephones. For example, in a case of the electrical apparatus division, the user must wait for 4 minutes at the maximum. Then unfortunately telephoning at a time point immediately after the order of the particular company, the user must truly wait for 4 minutes. Thus, this is very inconvenient. Moreover, this results in an ineffective utilization of a telephone resource such as a telephone line and the like.

Although the order of the companies whose informations are supplied by voice is the order of the predetermined stock codes, a user who is not widely experienced in the stock transaction must wait for the order of the particular company while looking for respective companies on a stock column of a newspaper or a stock code table. Otherwise, there is a very high possibility that the user fails to hear the stock information about the pertinent company. If failing to hear the stock information as mentioned above, the user must wait for approximately 4 minutes in a case of the electrical apparatus division, for example. Moreover, this is extremely inconvenient also to a user who is widely experienced in the stock transaction, since the user must again wait for 4 minutes when rechecking the word escape or the mishearing or when intending to deal with many companies.

On the other hand, from the viewpoint of the information provider, when a user desires the presentation of the stock information about a desirable company, it is unfair to charge a fee for a data presentation including an information presentation which is not useful to the user. Otherwise, charging the fee for the information only as for the desirable company results in a complex system.

In the second example as explained above, the sport information through the voice broadcast in the above described second example is supplied in an appropriate order, after appropriate items in the respective sport genres are set by the information provider at that time. This results in a problem that, even when a user desires to know the sport information about a particular item, a user must wait for several minutes while hearing unnecessary information about items other than the particular item, based on the timing when telephoning. Furthermore, this also results in the ineffective utilization of the telephone resource such as the telephone line and the like.

On the other hand, from the viewpoint of the information provider, when a user desires a presentation of sport information as for a desirable item in a desirable sport genre, it is unfair to charge a fee for a data presentation including an information presentation which is not useful to the user. Otherwise, charging the fee for the information only as for the desirable item results in the complex system.

In the third example as explained above, a huge amount of retrieval database owned by the above mentioned navigation apparatus maker is used only for simply producing the navigation apparatus, for example, for writing map data of a particular territory or a particular type to the storage medium, such as CD-ROM and the like, to be set in the navigation apparatus. In other words, a directly effective utilization for the user of the navigation apparatus is not promoted.

Moreover, in the third example, only the map at the vicinity of the current position of the user of the portable telephone can be automatically displayed on a display device provided on the portable telephone. That is, it has a problem that it is impossible to retrieve and display various map data with high free degrees. Further, according to this navigation system, in many basic stations, it is necessary to store the map data concerned in the peripheral territories for respective one of the basic stations, so that it is also necessary to perform operations for the map data, such as an initialization, a change, an update, a modification and the like of the map data, for respective one of the basic stations. This results in another problem that the operations become complex.

SUMMARY OF THE INVENTION

From the viewpoint of the above mentioned problems, it is therefore a first object of the present invention to provide an information presentation system and a portable telephone apparatus with an information displaying function, which can quickly give desirable information to a user having a portable communication terminal apparatus, such as a portable telephone apparatus or the like, can simplify a charging operation to the user, and can improve an effective utilization of a telephone resource.

It is a second object of the present invention to provide an information presentation system and a portable telephone apparatus with an information displaying function, in which a user of a portable communication terminal apparatus, such as a portable telephone apparatus and the like, can directly make use of a huge amount of retrieval database owned by a service center, and thereby desirable map data can be easily displayed in the portable communication terminal apparatus.

The above mentioned first object of the present invention can be achieved by a first information presentation system provided with: a data server for providing a predetermined kind of information data classified into a plurality of preset data groups through a communication line; and a portable communication terminal apparatus connectable through the communication line to the data server. The portable communication terminal apparatus is provided with: a connecting device for connecting the portable communication terminal apparatus to the data server through the communication line; an input device for inputting or specifying a desirable code from among a plurality of data group codes each indicating respective one of the preset data groups; and a terminal side transmitting device for transmitting the inputted or specified code through the communication line to the data server. The data server is provided with: a server side receiving device for receiving the transmitted code; and a server side transmitting device for transmitting the information data as for the data group corresponding to the received code by a predetermined format from the data server to the portable communication terminal apparatus through the communication line. The portable communication terminal apparatus is further provided with: a terminal side receiving device for receiving the transmitted information data; and a displaying device for displaying the received information data.

According to the first information presentation system, at first, on the side of the portable communication terminal apparatus, the portable communication terminal apparatus is connected to the data server through the communication line, by the connecting device. Then, by the input device, a desirable code from among the data group codes is inputted or specified. Then, after the connection through the communication line is established, the inputted or specified code is transmitted through the communication line to the data server. Next, on the side of the data server, the transmitted code is received by the server side receiving device. Then, by the server side transmitting device, the information data as for the data group corresponding to the received code is transmitted by a predetermined format from the data server to the portable communication terminal apparatus through the communication line. Next, on the side of the portable communication terminal apparatus, the transmitted information data is received by the terminal side receiving device. Finally, the received information data is displayed by the displaying device.

Accordingly, the information data about the data group corresponding to the desirable code sent by the portable communication terminal apparatus is transmitted from the data server to the portable communication terminal apparatus through the communication line, and this transmitted information data is displayed by the displaying device. Hence, it is possible to quickly receive and display the information data corresponding to the desirable code specified by the user.

In one aspect of the first information presentation system, the information data is stock information data, the data group is a group for each classified industry division, and the data group code is an industry division code indicative of each of industry divisions. The input device is adapted to input or specify at least one desirable code of the industry division code and a plurality of classified company stock codes each indicating respective one of preset companies. And that, the server side transmitting device transmits the stock information data as for the company corresponding to the code inputted or specified by the input device by a predetermined format from the data server to the portable communication terminal apparatus through the communication line. Here, the "classified company stock code" is a code consisting of 4 digits number etc., set in advance by the stock trading industry for respective one of the listed companies, in the same manner as the aforementioned conventional cases. The "industry division code" may be a code consisting of the upper 2 digits of the classified company stock code, or may be a telephone number or an exclusive code set with no relation to the classified company stock code by dividing the whole industry by appropriate division units in consideration with an ability of the data server or the communication line. Further, inputting or specifying these classified company stock code and the industry division code may be performed by directly inputting the code by use of numeral, by key-inputting the industry name or company name by use of character, or by specifying the industry name or the company name which are menu-displayed, so as to indirectly specify the code corresponding to the industry name or the company name.

Accordingly, the stock information data about the company corresponding to the desirable code sent by the portable communication terminal apparatus is transmitted from the data server to the portable communication terminal apparatus through the communication line, and this transmitted stock information data is displayed by the displaying device. Hence, it is possible to quickly receive and display the stock information data corresponding to the desirable code specified by the user.

Especially according to this one aspect, it is possible to quickly receive and display the desirable stock information, while in the aforementioned conventional stock information presentation system by means of the voice broadcast, it is necessary to wait for the order in which the stock information is broadcasted by a period depending on a telephoned time point, in order to obtain the desirable stock information. Moreover, in order to obtain the stock information about a plurality of companies in the aforementioned conventional system, the telephone line must be maintained for a long time based on the number of the companies and an order interval thereof. However, the present invention in this aspect is very advantageous since the necessary data can be transmitted and read in collectively by one action. Further, the telephone line connection time can be extremely reduced by specifying a plurality of codes corresponding to the targeted stock information before the line connection. Also, it is possible to read in the stock information about all the companies belonging to one industry division collectively by one action. Furthermore, according to the present invention, it is possible to check the stock information in a short time, and also possible to check after the telephone line is cut off.

In this one aspect, it may be preferred that: the data server is further provided with a plurality of classified division databases, each of which stores respective one of the data groups classified into the industry divisions and to which respectively different telephone numbers are assigned; the input device is adapted to input or specify at least one desirable code of the industry division code and the classified company stock code before establishing a connection through the communication line; and the connecting device connects the portable communication terminal apparatus to one of the classified division databases as for the industry division corresponding to the inputted or specified code through the communication line.

Accordingly, by using a plurality of classified division databases each providing the stock information data which is classified into the predetermined kinds of the classified industry divisions and to which the respectively different telephone numbers are assigned, in the data server it is possible to quickly access the necessary classified division databases. Thus, it is possible to receive and display the desirable stock information data effectively and quickly, in the portable communication terminal apparatus.

In this one aspect, it may be preferred that: the portable communication terminal apparatus is further provided with a second memory device for storing company name data corresponding to each of the classified company stock codes; and the displaying device refers to the stored company name data and displays the stock information data together with the company name data corresponding to the displayed stock information data.

Accordingly, the displaying device uses the company name data corresponding to each of the item codes stored in the second memory device to thereby display the company name data. Hence, it can display the company name data together with the transmitted stock information data, based on the item code, without transmitting the company name code. Moreover, it is possible to instantly obtain the corresponding company name data, by inputting only the item code, without inputting the company name data through the inputting device.

In another aspect of the first information presentation system, the information data is sport information data, the data group is a group for each classified sport genre, and the data group code is a sport genre code indicative of each of sport genres. The input device is adapted to input or specify at least one desirable code of the sport genre code and a plurality of classified item codes each indicating respective one of preset items in predetermined kinds. And that, the server side transmitting device transmits the sport information data as for the sport genre and the item corresponding to the code inputted or specified by the input device by a predetermined format from the data server to the portable communication terminal apparatus through the communication line. Here, the "sport genre code" may be an exclusive code consisting of 2 digits number etc., or an exclusive telephone number set in advance for each of the sport genres such as a baseball, a tennis, a golf, a horse race, a SUMO wrestling and the like. The "item code" may be an exclusive code consisting of 2 digits number etc. set in advance for each of the items in predetermined kinds, such as a fixture (i. e. a card or game date), a card name (e.g. a race name, a tournament name, a match name), a player name, a team name and the like. The item codes may include a plurality of detailed genre codes indicating the more finely categorized detail genres, such as a professional baseball, an amateur baseball, a social baseball, a high-school baseball, a foreign baseball, a national baseball and the like, as for the "baseball" genre, for example. Further, inputting or specifying these sport genre code and the item code may be performed by directly inputting the code by use of numeral, by key-inputting the sport genre name or item name by use of character, or by specifying the sport genre name or the item name which are menu-displayed, so as to indirectly specify the code corresponding to the sport genre name or the item name.

Accordingly, the sport information data corresponding to the desirable sport genre code and the desirable item code sent by the portable communication terminal apparatus is transmitted from the data server to the portable communication terminal apparatus through the communication line, and this transmitted sport information data is displayed by the displaying device. Hence, it is possible to quickly receive and display the desirable sport information data specified by the user.

Especially according to this aspect, it is possible to quickly receive and display the desirable sport information, while in the aforementioned conventional sport information presentation system by means of the voice broadcast, it is necessary to wait for the order in which the sport information is broadcasted by a period depending on a telephoned time point, in order to obtain the desirable sport information. Moreover, in order to obtain the sport information about a plurality of sports in the aforementioned conventional system, the telephone line must be maintained for a long time based on a number of the sports and an order interval thereof. However, the present invention in this aspect is very advantageous since the necessary data can be transmitted and read in collectively by one action. Further, the telephone line connection time can be extremely reduced by specifying a plurality of codes corresponding to the targeted sport information before the line connection. Also, it is possible to read in the sport information about all the items belonging to one sport genre collectively by one action. Furthermore, according to the present invention, it is possible to check the sport information in a short time, and also possible to check after the telephone line is cut off.

In this another aspect, it may be preferred that the item codes is provided with at least one of: a plurality of fixture codes each indicating a fixture date; a plurality of card name codes each indicating a name of a card; a plurality of player name codes each indicating a name of a player; a plurality of team name codes each indicating a name of a team; and a plurality of detail genre codes each indicating a detail genre in which each of the sport genres is classified more finely.

Accordingly, the portable communication terminal apparatus can receive the sport information as for a fixture date, a name of a card, a name of a player, a name of a team, a detail genre and so on, from the data server.

In this another aspect, it may be preferred that: the data server is further provided with a plurality of classified genre databases, each of which stores respective one of the data groups classified into the sport genres and to which respectively different telephone numbers are assigned; the input device is adapted to input or specify one desirable sport genre code before establishing a connection through the communication line; and the connecting device connects the portable communication terminal apparatus to one of the classified genre databases as for the sport genre corresponding to the inputted or specified sport genre code through the communication line.

Accordingly, by using a plurality of classified genre databases each providing the sport information data which is classified into the predetermined kinds of the classified sport genres and to which the respectively different telephone numbers are assigned, in the data server it is possible to quickly access the necessary classified genre databases. Thus, it is possible to receive and display the desirable sport information data effectively and quickly, in the portable communication terminal apparatus.

In this another aspect, it may be preferred that: the portable communication terminal apparatus is further provided with a second memory device for storing at least one of (i) sport genre display data for character-displaying the sport genre corresponding to each of the sport genre codes and (ii) item display data for character-displaying the item corresponding to each of the item codes; and the displaying device refers to at least one of the stored sport genre display data and the stored item display data and displays the sport information data together with at least one of the character-displayed sport genre and item corresponding to the displayed sport information data.

Accordingly, the displaying device uses the sport genre display data or the item display data stored in the second memory device to thereby character-display the sport genre or the item. Hence, it can character-display the sport genre or item together with the transmitted sport information data, based on the code, without transmitting data indicating the sport genre name or item name. Moreover, it is possible to instantly obtain the character-display of the sport genre name or the item name, by inputting only the code, without inputting the sport genre name or item name through the inputting device.

In another aspect of the first information presentation system, the portable communication terminal apparatus is further provided with a first memory device for storing the received information data. And that, the displaying device displays the stored information data.

Accordingly, the displaying device displays the information data once stored in the first memory device. Hence, it is possible to flexibly display and process the information data. Especially, since it is possible to utilize the desirable information even after cutting off the communication line, the telephone resource can be efficiently utilized, and that, it is possible to check the information after cutting off the communication line.

In this another aspect, it may be preferred that: the input device is adapted to specify the information data stored in the first memory device; and the displaying device displays the information data specified by the input device.

Accordingly, since the specified information data can be displayed by specifying by use of the input device, even if the display ability of the displaying device is relatively low as compared with the data amount of the information data stored in the first memory, the information data desired by the user can be appropriately displayed, which is very convenient.

In this another aspect, it may be preferred that the server side transmitting device adjusts an amount of the information data to be transmitted on the basis of a memory ability of the first memory device.

Accordingly, since the server side transmitting device adjusts the amount of the transmitted information data based on the memory ability of the first memory device, the free degree with regard to the memory ability of the memory device becomes large. Hence, this is advantageous in manufacturing the portable communication terminal apparatus.

In this case, it may be preferred that: the terminal side transmitting device further transmits memory ability information indicative of the memory ability of the first memory device to the data server through the communication line, after establishing the connection through the communication line; the server side receiving device further receives the transmitted memory ability information; and the server side transmitting device adjusts the amount of the information data to be transmitted on the basis of the received memory ability information.

Accordingly, the memory ability information indicative of the memory ability of the first memory device is transmitted to the data server, and the server side transmitting device adjusts the amount of the presentation data to be transmitted on the basis of this memory ability information. Hence, the information presentation system can smoothly work even by using the various portable communication terminal apparatuses, whose memory abilities are not constant.

In this another aspect, it may be preferred that: the first memory device has a memory ability to store more information data in data amount than the information data which the displaying device can display at one time; the input device is adapted to specify a portion to be scroll-displayed among the information data with respect to the displaying device; and the displaying device scroll-displays the portion specified by the input device among the stored information data.

Accordingly, the more information data in data amount than the information data which the displaying device can display at one time is stored in the first memory device, and the scroll display is performed by using this stored information data. Hence, it is possible to perform the extremely quicker scroll display as compared with the access to the data server for each screen through the communication line.

In another aspect of the first information presentation system, the connecting device cuts off a connection through the communication line, if there is no input by the input device for a predetermined period.

Accordingly, the connecting device cuts off the line connection, if the input is not performed by the input device for the predetermined period. Hence, the uselessness of the utilization time of the communication line can be reduced even if the user forgets the cutoff of the line connection.

In another aspect of the first information presentation system, the data server is further provided with a line cutoff device for cutting off a connection through the communication line, if the server side receiving device does not receive the inputted or specified code from the portable communication terminal apparatus for a predetermined period.

Accordingly, the line cutoff device cuts off the line connection, if the server side receiving device does not receive the predetermined kind of information from the portable communication terminal apparatus for the predetermined period. Then, the uselessness of the utilization time of the communication line is also reduced, even if the user forgets the cutoff of the line connection.

In another aspect of the first information presentation system, the displaying device continues displaying after a connection through the communication line is cut off.

Accordingly, since the displaying device continues the display even after the connection through the communication line is cut off, the user continues to see the information data read in through the communication line, while the utilization time of the communication line is shortened.

In another aspect of the first information presentation system, the portable communication terminal apparatus has a telephoning function. The displaying device is adapted to further display a telephone number to be called by the telephoning function. And that, the input device is provided with a call key to call the telephone number displayed by the displaying device.

Accordingly, when the call key is actuated, the call to the telephone number displayed by the displaying device is executed. Hence, the operation of telephoning the desirable telephone number becomes easy. Especially, for example, since it is possible to telephone a transaction department of a stock company immediately after looking at a current stock price on the display screen, the user can obtain a condition as if the user were at the stock company regardless of the user's actual location as long as the user has the portable communication terminal apparatus, which is very convenient for the user. Further, for example, it is possible to make a reservation for a scheduled competition card by telephone immediately after looking at the scheduled competition card, which is also very convenient for the user.

In another aspect of the first information presentation system, a telephone station intervenes in the communication line. And that, the system is further provided with a charging device at the telephone station for charging a line utilization fee for the communication line and charging a data presentation fee for the information data instead of the data server with respect to the portable communication terminal apparatus.

Accordingly, the data presentation fee for the information data is charged with respect to the portable communication terminal apparatus instead of the data server, by the charging device provided in the telephone station. Thus, it is possible to prevent the apparatus construction or the control method in the data server from being complicated, and it is possible to easily charge the appropriate data presentation fee in line with the data presentation amount of the necessary information for the user, which is convenient.

The above mentioned first object of the present invention can be also achieved by a second information presentation system provided with: a data server including a plurality of classified division databases, each of which stores information data classified into a plurality of predetermined kinds of divisions and to which respectively different telephone numbers are assigned, for providing the information data through a communication line; and a portable communication terminal apparatus connectable through the communication line to the data server. The portable communication terminal apparatus is provided with: an input device for inputting or specifying a telephone number; and a connecting device for connecting the portable communication terminal apparatus to one of the classified division databases, to which the inputted or specified telephone number is assigned, through the communication line. The data server is provided with a server side transmitting device for transmitting the information data by a predetermined format from the one of the classified division databases, to which the portable communication terminal apparatus is connected, to the portable communication terminal apparatus through the communication line. And that, the portable communication terminal apparatus is further provided with: a terminal side receiving device for receiving the transmitted information data; a first memory device for storing the received information data; and a displaying device for displaying the stored information data.

According to the second information presentation system of the present invention, at first, on the side of the portable communication terminal apparatus, when the telephone number is inputted or specified by the input device, the portable communication terminal apparatus is connected to one of the classified division databases, to which the inputted or specified telephone number is assigned, through the communication line by the connecting device. At this time, inputting or specifying the telephone number may be performed by directly inputting it by use of numeral, by specifying one of the menu-displayed telephone numbers assigned to respective industry divisions, or by specifying one of the menu-displayed division names by use of a cursor or the like, so as to indirectly specify the telephone number. Next, on the side of the data server, the information data is transmitted by a predetermined format from the one of the classified division databases, to which the portable communication terminal apparatus is connected, to the portable communication terminal apparatus through the communication line, by the server side transmitting device. Next, on the portable communication terminal apparatus, the transmitted information data is received by the terminal side receiving device, and the received information data is stored into the first memory device. Finally, the stored information data is displayed by the displaying device.

Accordingly, all of the information data classified into a desired division can be read in collectively just by specifying the telephone number, and it is possible after that to appropriately display the information data stored in the first memory device.

In one aspect of the second information presentation system, the information data is stock information data, and the predetermined kinds of divisions are industry divisions.

Accordingly, the stock information data as for all of the companies belonging to the desired industry division can be read in collectively just by specifying the telephone number, and it is possible after that to appropriately display the stock information data stored in the first memory device.

Especially according to this aspect, it is possible to quickly receive and display the desirable stock information, while in the aforementioned conventional stock information presentation system by means of the voice broadcast, it is necessary to wait for the order in which the stock information is broadcasted by a period depending on a telephoned time point, in order to obtain the desirable stock information. Moreover, in order to obtain the stock information about a plurality of companies in the aforementioned conventional system, the telephone line must be maintained for a long time based on a number of the companies and an order interval thereof. However, the present invention in this aspect is very advantageous since the stock information as for all of the companies belonging to one industry division can be transmitted and read in collectively by one action. Thus, after reading in or especially cutting off the communication line, the stock information of the desirable company can be appropriately seen by the displaying device, which is very convenient for the user.

In another aspect of the second information presentation system, the information data is sport information data, and the predetermined kinds of divisions are sport genres.

Accordingly, the sport information data as for all of the items belonging to the desired sport genre can be read in collectively just by specifying the telephone number, and it is possible after that to appropriately display the sport information data stored in the first memory device.

Especially according to this aspect, it is possible to quickly receive and display the desirable sport information, while in the aforementioned conventional sport information presentation system by means of the voice broadcast, it is necessary to wait for the order in which the sport information is broadcasted by a period depending on a telephoned time point, in order to obtain the desirable sport information. Moreover, in order to obtain the sport information about a plurality of sports in the aforementioned conventional system, the telephone line must be maintained for a long time based on a number of the sports and an order interval thereof. However, the present invention in this aspect is very advantageous since the sport information as for all of the items belonging to one sport genre can be transmitted and read in collectively by one action. Thus, after reading in or especially cutting off the communication line, the sport information of the desirable item can be appropriately seen by the displaying device, which is very convenient for the user.

In another aspect of the second information presentation system, the first memory device has a memory ability to store more information data in data amount than the information data which the displaying device can display at one time. The input device is adapted to specify a portion to be scroll-displayed among the information data with respect to the displaying device. And that, the displaying device scroll-displays the portion specified by the input device among the stored information data.

Accordingly, the more information data in data amount than the information data which the displaying device can display at one time is stored in the first memory device, and the scroll display is performed by using this stored information data. Hence, it is possible to perform the extremely quicker scroll display as compared with the access to the data server for each screen through the communication line.

The above mentioned first object of the present invention can be also achieved by a first portable telephone apparatus with an information displaying function connectable to a data server through a communication line. The data server provides a predetermined kind of information data classified into a plurality of preset data groups by transmitting, when receiving a code among a plurality of data group codes each indicating respective one of the data groups though the communication line, the information data in one data group corresponding to the received code. The first portable telephone apparatus is provided with: a connecting device for connecting the portable telephone apparatus to the data server through the communication line; an input device for inputting or specifying a desirable code from among the data group codes; a terminal side transmitting device for transmitting the inputted or specified code through the communication line to the data server; a terminal side receiving device for receiving the transmitted information data transmitted by the data server, which receives the transmitted code, in correspondence with the received code, through the communication line; and a displaying device for displaying the received information data.

Accordingly, in the same manner as the portable communication terminal apparatus in the aforementioned first information presentation system of the present invention, it is possible to quickly receive and display the desirable information data which is specified by the user.

In one aspect of the first portable telephone apparatus, the information data is stock information data, the data group is a group for each classified industry division, and the data group code is an industry division code indicative of each of industry divisions. The input device is adapted to input or specify at least one desirable code of the industry division code and a plurality of classified company stock codes each indicating respective one of preset companies. And that, the data server transmits the stock information data as for the company corresponding to the code inputted or specified by the input device to the portable communication terminal apparatus through the communication line.

Accordingly, it is possible to quickly receive and display the desirable stock information data which is specified by the user.

In this one aspect, it may be preferred that the portable telephone apparatus is further provided with a second memory device for storing company name data corresponding to each of the classified company stock codes. And that, the displaying device refers to the stored company name data and displays the stock information data together with the company name data corresponding to the displayed stock information data.

Accordingly, the company name data can be displayed by use of the company name data corresponding to the classified company stock code stored in the second memory. Thus, it is possible to display the company name data, on the basis of the classified company stock code, together with the transmitted stock information data without transmitting the company name data.

In another aspect of the first portable telephone apparatus, the information data is sport information data, the data group is a group for each classified sport genre, and the data group code is a sport genre code indicative of each of sport genres. The input device is adapted to input or specify at least one desirable code of the sport genre code and a plurality of classified item codes each indicating respective one of preset items in predetermined kinds. And that, the data server transmits the sport information data as for the sport genre and the item corresponding to the code inputted or specified by the input device to the portable communication terminal apparatus through the communication line.

Accordingly, it is possible to quickly receive and display the desirable sport information data which is specified by the user.

In this aspect, the item codes may be provided with at least one of: a plurality of fixture codes each indicating a fixture date; a plurality of card name codes each indicating a name of a card; a plurality of player name codes each indicating a name of a player; a plurality of team name codes each indicating a name of a team; and a plurality of detail genre codes each indicating a detail genre in which each of the sport genres is classified more finely.

Accordingly, it is possible to receive the sport information as for a fixture date, a name of a card, a name of a player, a name of a team, a detail genre and so on, from the data server.

Alternatively, in this aspect, the portable telephone apparatus may be further provided with a second memory device for storing at least one of (i) sport genre display data for character-displaying the sport genre corresponding to each of the sport genre codes and (ii) item display data for character-displaying the item corresponding to each of the item codes. And that, the displaying device may refer to at least one of the stored sport genre display data and the stored item display data and may display the sport information data together with at least one of the character-displayed sport genre and item corresponding to the displayed sport information data.

Accordingly, it is possible to character-display the sport genre or item together with the transmitted sport information data, based on the code, without transmitting data indicating the sport genre name or item name. Moreover, it is possible to instantly obtain the character-display of the sport genre name or the item name, by inputting only the code, without inputting the sport genre name or item name through the inputting device.

In another aspect of the first portable telephone apparatus, the portable telephone apparatus is further provided with a first memory device for storing the received information data. And that, the displaying device displays the stored information data.

Accordingly, since the displaying device displays the information data once stored in the first memory device, it is possible to flexibly display and process the information data.

In this case, it is may be preferred that the first memory device has a memory ability to store more information data in data amount than the information data which the displaying device can display at one time. The input device is adapted to specify a portion to be scroll-displayed among the information data with respect to the displaying device. And that, the displaying device scroll displays the portion specified by the input device among the stored information data.

Accordingly, the more information data in data amount than the information data which the displaying device can display at one time is stored in the first memory device, and the scroll display is performed by using this stored information data. Hence, it is possible to perform the extremely quicker scroll display as compared with the access to the data server for each screen through the communication line.

The above mentioned second object of the present invention can be achieved by a third information presentation system provided with: a service center for providing presentation data including map data through a communication line; and a portable communication terminal apparatus connectable through the communication line to the service center. The portable communication terminal apparatus is provided with: a connecting device for connecting the portable communication terminal apparatus to the service center through the communication line; an input device for inputting or specifying a desirable telephone number; and a terminal side transmitting device for transmitting the inputted or specified telephone number through the communication line to the service center after establishing a connection through the communication line. The service center is provided with: a center side receiving device for receiving the transmitted telephone number; and a center side transmitting device for transmitting presentation data as for a territory corresponding to the received telephone number by a predetermined format from the service center to the portable communication terminal apparatus through the communication line. And that, the portable communication terminal apparatus is further provided with: a terminal side receiving device for receiving the transmitted presentation data; and a displaying device for displaying the received presentation data.

According to the third information presentation system of the present invention, at first, on the side of the portable communication terminal apparatus, the portable communication terminal apparatus is connected to the service center through the communication line by the connecting device. Then, a desirable telephone number is inputted or specified by the input device. Then, the inputted or specified telephone number is transmitted by the terminal side transmitting device through the communication line to the service center after establishing a connection through the communication line. Next, on the side of the service center, the transmitted telephone number is received by the center side receiving device. Then, presentation data as for a territory corresponding to the received telephone number is transmitted by a predetermined format from the service center to the portable communication terminal apparatus through the communication line, by the center side transmitting device. Next, on the side of the portable communication terminal apparatus, the transmitted presentation data is received by the terminal side receiving device. Finally, the received presentation data is displayed by the displaying device.

Accordingly, the presentation data about the territory corresponding to the telephone number sent by the portable communication terminal apparatus is transmitted from the service center to the portable communication terminal apparatus through the communication line. This transmitted presentation data is displayed by the displaying device. Hence, it is possible to receive and display the map data related to an arbitrary telephone number specified by the user.

Especially according to the third information presentation system, it is possible to receive and display the map data related to an arbitrary telephone number specified by the user, although the aforementioned conventional portable telephone navigation system can display only the map at the vicinity of the telephoned current position. Thus, this invention is very convenient. Moreover, in the aforementioned conventional portable telephone navigation system, it is necessary to store the map in the peripheral territories for each of a plurality of basic stations in advance. However, in the third information presentation system of the present invention, the user can access the retrieval database of an information providing station, and can directly receive the desirable map data from the retrieval database irrespective of the number of the basic stations. Hence, this invention is extremely convenient.

In one aspect of the third information presentation system, the connecting device contains a call key for calling out the service center through the communication line.

Accordingly, the service center is called out by the operation of the call key. Thus, the service center can be called out simply and quickly. Hence, it is possible to retrieve the presentation data, such as the map data and the like, relatively quickly.

In another aspect of the third information presentation system, the portable communication terminal apparatus is further provided with a first memory device for storing the received presentation data. And that, the displaying device displays the stored presentation data.

Accordingly, the displaying device displays the presentation data once stored in the first memory device. Hence, it is possible to flexibly display and process the presentation data, such as the received map data and the like.

In this another aspect, it may be preferred that the center side transmitting device adjusts an amount of the presentation data to be transmitted on the basis of a memory ability of the first memory device.

Accordingly, the center side transmitting device adjusts the amount of the transmitted presentation data based on the memory ability of the first memory device. Thus, the free degree with regard to the memory ability of the memory device becomes large. Hence, this is advantageous in manufacturing the portable communication terminal apparatus.

Further in this case, it may be preferred that: the terminal side transmitting device further transmits memory ability information indicative of the memory ability of the first memory device to the service center through the communication line, after establishing the connection through the communication line; the center side receiving device further receives the transmitted memory ability information; and the center side transmitting device adjusts the amount of the presentation data to be transmitted on the basis of the received memory ability information.

Accordingly, the memory ability information indicative of the memory ability of the first memory device is transmitted to the service center, and the center side transmitting device adjusts the amount of the presentation data to be transmitted on the basis of this memory ability information. Hence, the information presentation system can smoothly work even by using the various portable communication terminal apparatuses, whose memory abilities are not constant.

Further in this aspect, it may be preferred that: the first memory device has a memory ability to store more presentation data in data amount than the presentation data which the displaying device can display at one time; the input device is adapted to specify a portion to be scroll-displayed among the presentation data with respect to the displaying device; and the displaying device scroll-displays the portion specified by the input device among the stored presentation data.

Accordingly, the more presentation data in data amount than the presentation data which the displaying device can display at one time is stored in the first memory device, and the scroll display is performed by using this stored presentation data. Hence, it is possible to perform the extremely quicker scroll display as compared with the access to the service center for each screen through the communication line.

In another aspect of the third information presentation system, the input device is adapted to input selection information indicative of at least one of an area and a facility, which are desired to be displayed by the displaying device. The terminal side transmitting device further transmits the selection information inputted by the input device to the service center through the communication line. The center side receiving device further receives the transmitted selection information. And that, the center side transmitting device transmits the presentation data corresponding to the received selection information.

Accordingly, the selection information indicative of the desirably displayed area or facility is transmitted to the service center, and the center side transmitting device transmits the presentation data based on the selection information. Hence, it is possible to transmit only the especially necessary information without uselessness. As a result, it is possible to implement a quick call of data by using the portable communication terminal apparatus having a relatively low performance.

In another aspect of the third information presentation system, the connecting device cuts off a connection through the communication line, if there is no input by the input device for a predetermined period.

Accordingly, the connecting device cuts off the line connection, if the input is not performed by the input device for the predetermined period. Hence, the uselessness of the utilization time of the communication line can be reduced even if the user forgets the cutoff of the line connection.

In another aspect of the third information presentation system, the service center is further provided with a line cutoff device for cutting off a connection through the communication line, if the center side receiving device does not receive a predetermined kind of information from the portable communication terminal apparatus for a predetermined period.

Accordingly, the line cutoff device cuts off the line connection, if the center side receiving device does not receive the predetermined kind of information from the portable communication terminal apparatus for the predetermined period. Then, the uselessness of the utilization time of the communication line is also reduced, even if the user forgets the cutoff of the line connection.

In another aspect of the third information presentation system, the portable communication terminal apparatus is further provided with a second memory device for storing the presentation data displayed by the displaying device. The input device is adapted to specify a storing operation of the presentation data into the second memory device. And that, the connecting device cuts off a connection through the communication line, when the storing operation is specified by the input device.

Accordingly, the connecting device cuts off the line connection, when the presentation data is stored into the second memory device by the input device. Hence, it is possible to inhibit the uselessness of the utilization time of the communication line.

In these aspects in which the connection through the communication line is cut off, the displaying device may continue displaying after the connection through the communication line is cut off.

Accordingly, the displaying device continues the display even after the connection through the communication line is cut off. Hence, the user continues to see the presentation data, such as the map data and the like, read in through the communication line, while the utilization time of the communication line is shortened.

In another aspect of the third information presentation system, the portable communication terminal apparatus has a telephoning function and is provided with: a second memory device for storing the presentation data displayed by the displaying device together with the corresponding telephone number; and a judging device for judging whether or not a telephone number identical to a telephone number called when a telephone call is made by the telephoning function is stored in the second memory device. And that, the displaying device displays the presentation data corresponding to the identical telephone number when the telephone call is made by the telephoning function, if it is judged by the judging device that the identical telephone number is stored.

Accordingly, when telephoning, if a telephone number identical to the calling telephone number is stored in the second memory device, the displaying device displays the presentation data corresponding to this telephone number. Hence, the operability of the portable communication terminal apparatus is excellent.

In another aspect of the third information presentation system, the input device is adapted to specify as a mark position any position on the map data displayed by the displaying device. The displaying device superimposes and displays a mark in a predetermined style on the displayed map data at the mark position specified by the input device. And that, the portable communication terminal apparatus is further provided with a second memory device for storing mark information indicative of the mark position together with the presentation data displayed by the displaying device.

Accordingly, the mark can be put on any position on the map data by the input device, and the mark information is stored in the second memory device. Hence, since the image information peculiar to the user putting the mark can be prepared and maintained, this is convenient.

In this another aspect, a plurality of portable communication terminal apparatuses, each of which is identical with the portable communication terminal apparatus, may be installed. In one of the portable communication terminal apparatuses, the terminal side transmitting device may transmit the map data and the mark information stored in the second memory device through the communication line to another of the portable communication terminal apparatuses. In the another of the portable communication terminal apparatuses, the terminal side receiving device may further receive the transmitted map data and mark information. And that, the displaying device superimposes and displays a mark represented by the received mark information on the received map data.

Accordingly, the map data and the mark information are transmitted between a plurality of portable communication terminal apparatuses. Hence, since the particular place, such as the waiting place and the like, can be transmitted as the mark position on the map, this is very convenient.

In another aspect of the third information presentation system, the portable communication terminal apparatus has a telephoning function. The displaying device is adapted to further display a telephone number to be called by the telephoning function. And that, the input device is provided with a call key to call the telephone number displayed by the displaying device.

Accordingly, when the call key is actuated, the call to the telephone number displayed by the displaying device is executed. Hence, the operation of telephoning the desirable telephone number becomes easy.

As a result, according to the third information presentation system of the present invention, it is possible to realize the information presentation system, in which the user of the portable communication terminal apparatus, such as the portable telephone apparatus having the memory device with the relatively low memory ability and the like, can utilize a huge amount of retrieval database owned by the service center, directly and effectively, and the desirable map data can be easily displayed in the portable communication terminal apparatus.

The above mentioned second object of the present invention can be also achieved by a second portable telephone apparatus with an information displaying function connectable to a service center through a communication line. The service center provides presentation data including map data through the communication line by transmitting, when receiving a telephone number though the communication line, the presentation data as for a territory corresponding to the received telephone number. The second portable telephone apparatus is provided with: a connecting device for connecting the portable telephone apparatus to the service center through the communication line; an input device for inputting or specifying a desirable telephone number; a terminal side transmitting device for transmitting the inputted or specified telephone number through the communication line to the service center after establishing a connection through the communication line; a terminal side receiving device for receiving the transmitted presentation data transmitted by the service center, which receives the transmitted telephone number, in correspondence with the received telephone number, through the communication line; and a displaying device for displaying the received presentation data.

Accordingly, in the same manner as the portable communication terminal apparatus in the aforementioned third information presentation system of the present invention, it is possible to receive and display the map data related to an arbitrary telephone number specified by the user.

In one aspect of the second portable telephone apparatus, the portable telephone apparatus is further provided with a first memory device for storing the received presentation data. And that, the displaying device displays the stored presentation data.

Accordingly, the displaying device displays the presentation data once stored in the first memory device. Hence, it is possible to flexibly display and process the presentation data, such as the received map data and the like.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 16 is a concept diagram showing a data structure of a second RAM which the portable telephone apparatus in the third embodiment contains;

DETAILED DESCRIPTION OF THE PREFERRED EMBODIMENTS

Next, preferred embodiments of the present invention are explained with reference to the drawings.

First Embodiment

At first, a construction of a first embodiment is explained with reference to FIGS. 1 to 5.

Figure 1:
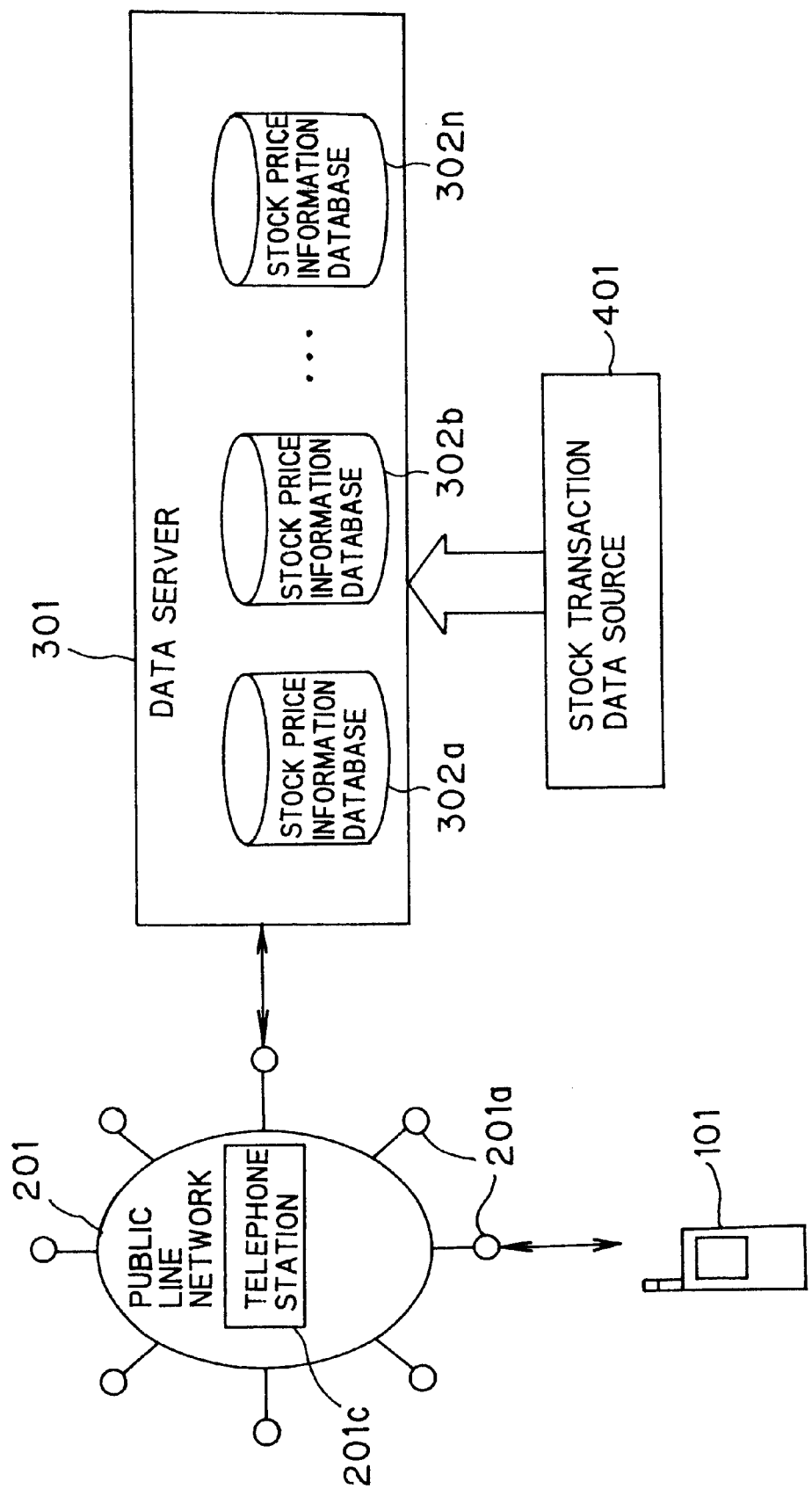
FIG. 1 is a block diagram showing a schematic configuration of a stock information presentation system of a first embodiment.

FIG. 1 is a schematic block diagram of a stock information presentation system as a first embodiment.

In FIG. 1, the stock information presentation system is provided with a portable telephone apparatus 101 as one example of a portable communication terminal apparatus, and a data server 301 connected to a portable telephone apparatus 101 through a public (telephone) line network 201 as one example of a communication line.

The portable telephone apparatus 101 has a telephone function of sending and receiving a normal voice by radio. Especially, the portable telephone apparatus 101 can send to the data server 301 at least one of an industry division code and a classified company stock code, which are set in advance by the stock industry and the like, after the portable telephone apparatus 101 is connected to the data server 301 through the public line network 201. However, the portable telephone apparatus 101 is provided with a small display, such as an LCD or the like, which can display the stock information data transmitted by the data server 301 in response.

The public line network 201 is constituted by an electrical wire, an optical fiber cable, a satellite communication network, a telephone exchange and the like, and it is especially provided with a base station 201a for radio-communicating with the portable telephone apparatus 101. The base stations 201a are arranged at an interval of approximately 100 meters in a town and the like. A telephone station 201c intervenes in the public line network 201.

The data server 301 has a plurality of stock price information databases 302a, 302b, . . . and 302n composed of stock information data. They are composed of stock information data classified for each predetermined kind of industry division, respectively. For example, the stock price information database 302a is composed of the stock price information data about a company belonging to an electrical apparatus division. The stock price information database 302*b* is composed of the stock price information data about a company belonging to a construction division. The transaction information as for stocks, which are sold and bought through a computer transaction system in the stock exchange market, is send to the data server 301 from a stock transaction data source 401 at a substantially real time, and is further supplied by the data server 301 through the public line network 201.

Figure 2:
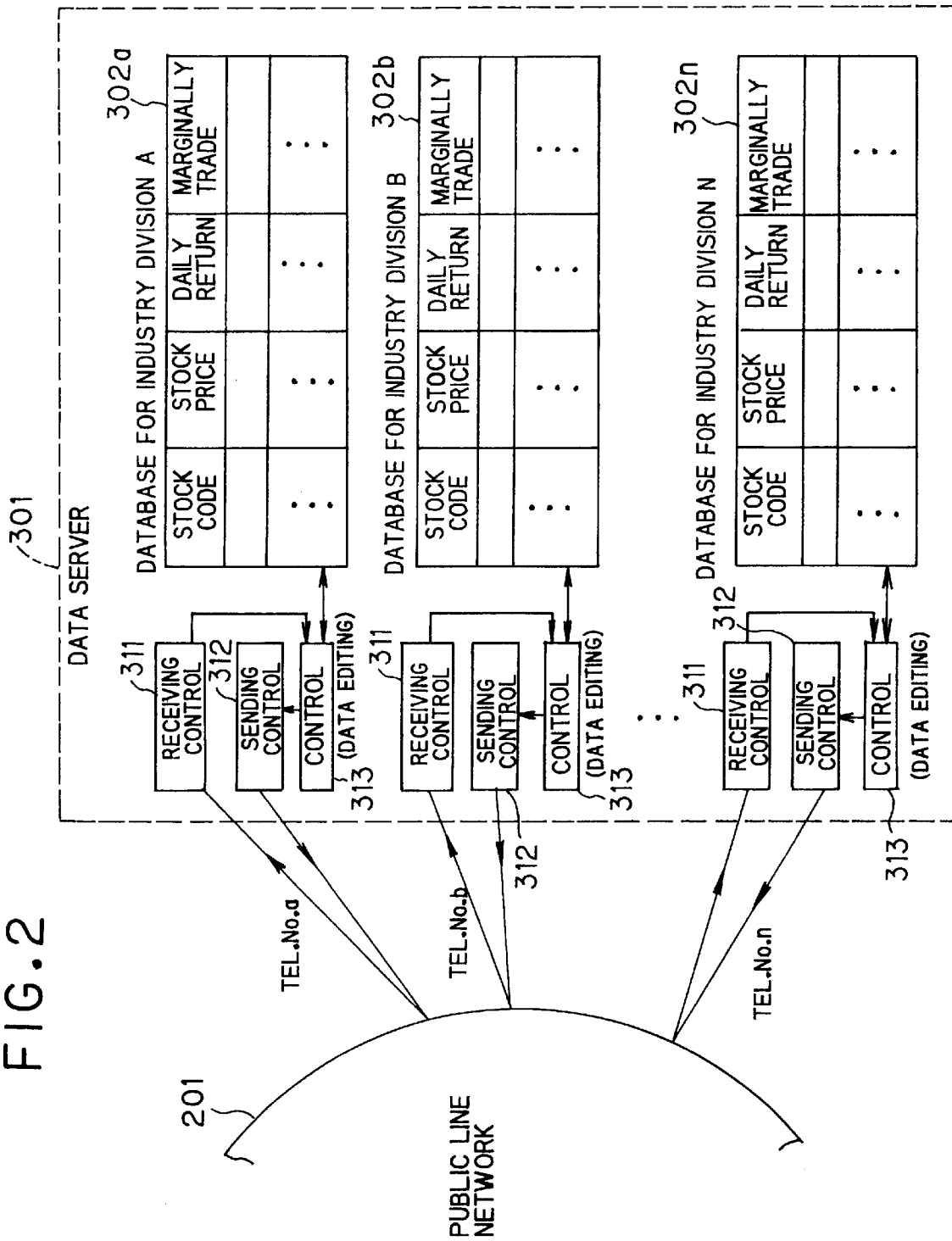
FIG. 2 is a block diagram showing one example of a configuration of a data server which the stock information presentation system in FIG. 1 contains.

FIG. 2 shows one example of a detailed configuration of the data server.

In FIG. 2, the data server 301 is provided with a plurality of databases 302*a*, 302*b*, . . . and 302*n* to which respectively different telephone numbers a to n are assigned. Moreover, the data server 301 is provided for each database, with: a receiving control section 311 for receiving the information, such as the classified company stock code and the like, which is sent through the public line network 201 by the portable telephone apparatus 101; a control section 313 for extracting the information data about the company corresponding to the received classified company stock code from the databases 302*a*, 302*b*, . and 302*n*, and then editing it by a predetermined format; and a sending control section 312 for sending the edited stock information data through the public line network 201 to the portable telephone apparatus 101. When called at the telephone number a, the receiving control section 311, the sending control section 312 and the control section 313 are actuated which correspond to the database 302*a* of an industry division A. When called at the telephone number b, the receiving control section 311, the sending control section 312 and the control section 313 are actuated which correspond to the database 302*b* of an industry division B. When called at the telephone number n, the receiving control section 311, the sending control section 312 and the control section 313 are actuated which correspond to the database 302*n* of an industry division N. In the present embodiment, one example of the server side receiving device is constituted of the receiving control section 311, one example of the server side transmitting device is constituted of the control section 313 and the sending control section 312.

As shown in FIG. 2, each of the stock information databases 302*a*, 302*b*, . . . and 302*n* includes classified company stock codes for a plurality of companies each belonging to the pertinent industry division, a latest or present stock price of the company corresponding to respective one of the classified company stock codes therefor, a daily return (increase or decrease against the stock price of the previous day) and a marginally traded stock information representing whether or not the pertinent brand is a marginally traded stock. In addition to them, the stock price database may include variously detailed information used in the stock industry, such as a final value of a morning market, a final value of an afternoon market, recent stock adjustment information, one week moving average information, one month moving average information, PER (earning per stock), PBR (book-value per stock) and the like, in relation to the respective one of the companies corresponding to the classified company stock code therefor.

As described above, the data server shown in FIG. 2 is constructed such that the databases corresponding to the classified industry division codes can be accessed from the portable telephone apparatus 101 in FIG. 1, by using the different telephone numbers respectively.

Figure 3:
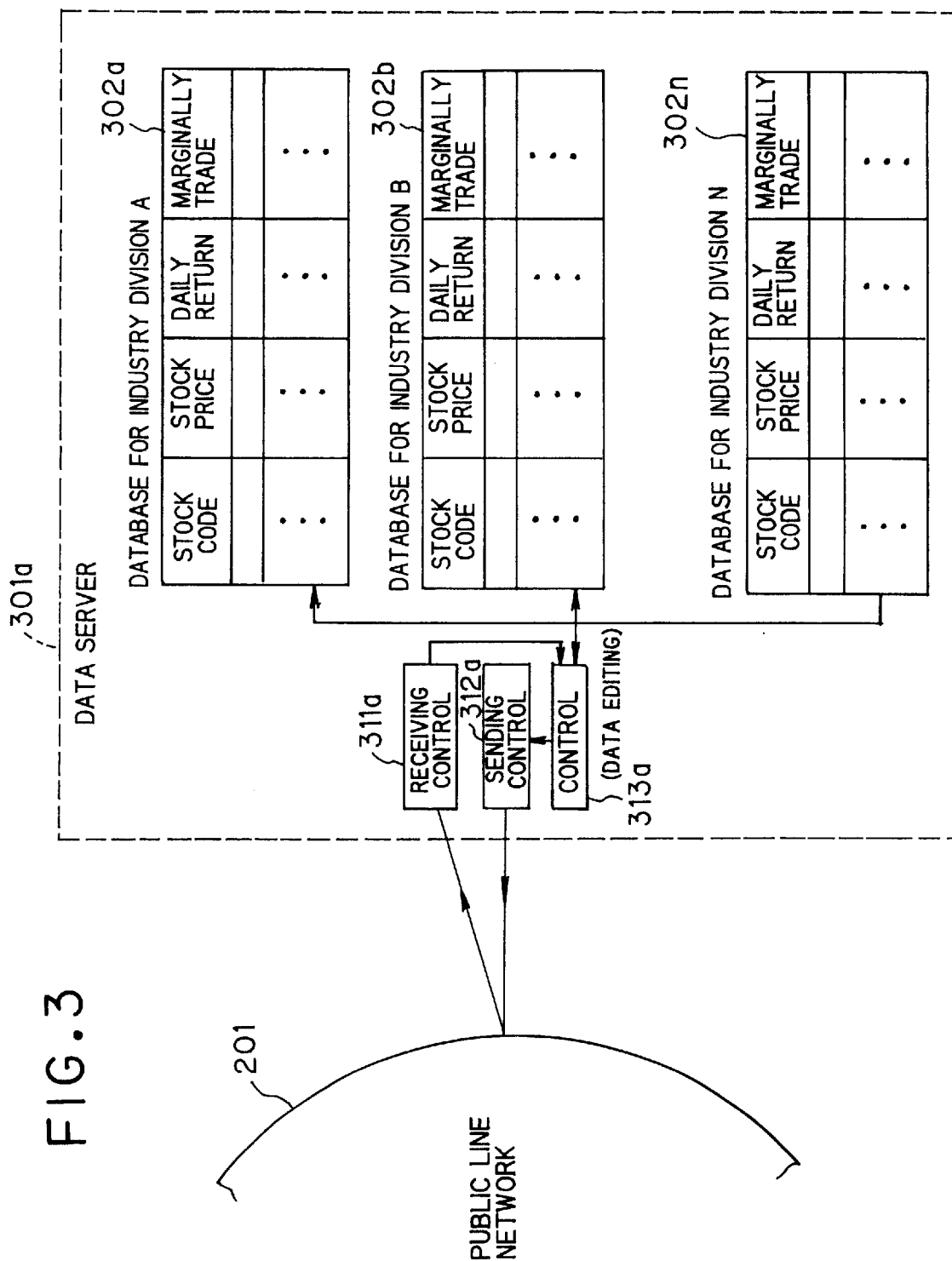
FIG. 3 is a block diagram showing another example of the configuration of the data server which the stock information presentation system in FIG. 1 contains.

FIG. 3 shows another example of the detailed configuration of the data server.

In FIG. 3, although a data server 301*a* contains a plurality of stock information databases 302*a*, 302*b*, . . . and 302*n* similar to those in FIG. 2, it is provided with: a receiving control section 311*a* for receiving information, such as a classified company stock code and the like, sent through a public linenetwork 201 from the portable telephone apparatus 101; a control section 313*a* for extracting the stock information data as for the company corresponding to the received classified company stock code from among the stock information databases 302*a*, 302*b*, . . . and 302*n*, and then editing it at a predetermined format; and a sending control section 312*a* for sending the edited stock information data through the public line network 201 to the portable telephone apparatus 101. In this manner, only one set of the receiving control section 311*a*, the control section 313*a* and the sending control section 312*a* are provided with respect to the databases as a whole. In this example, when called at one telephone number, the portable telephone apparatus 101 and the data server 301*a* are then line-connected to each other through the public line network 201. After that, the databases 302*a*, 302*b*, . . . and 302*n* corresponding to the classified industry division codes transmitted by the portable telephone apparatus 101 or the databases 302*a*, 302*b*, . . . and 302*n* corresponding to the industry division which the company corresponding to the classified company stock code belongs to are accessed by the control section 313*a*. In the present embodiment, one example of the server side receiving device is constituted of the receiving control section 311*a*, and one example of the server side transmitting device is constituted of the control section 313*a* and the sending control section 312*a*.

As described above, the data server 301*a* shown in FIG. 3 is constructed such that the portable telephone apparatus 101 in FIG. 1 can access the database of the classified industry division by using one telephone number.

Figure 4:
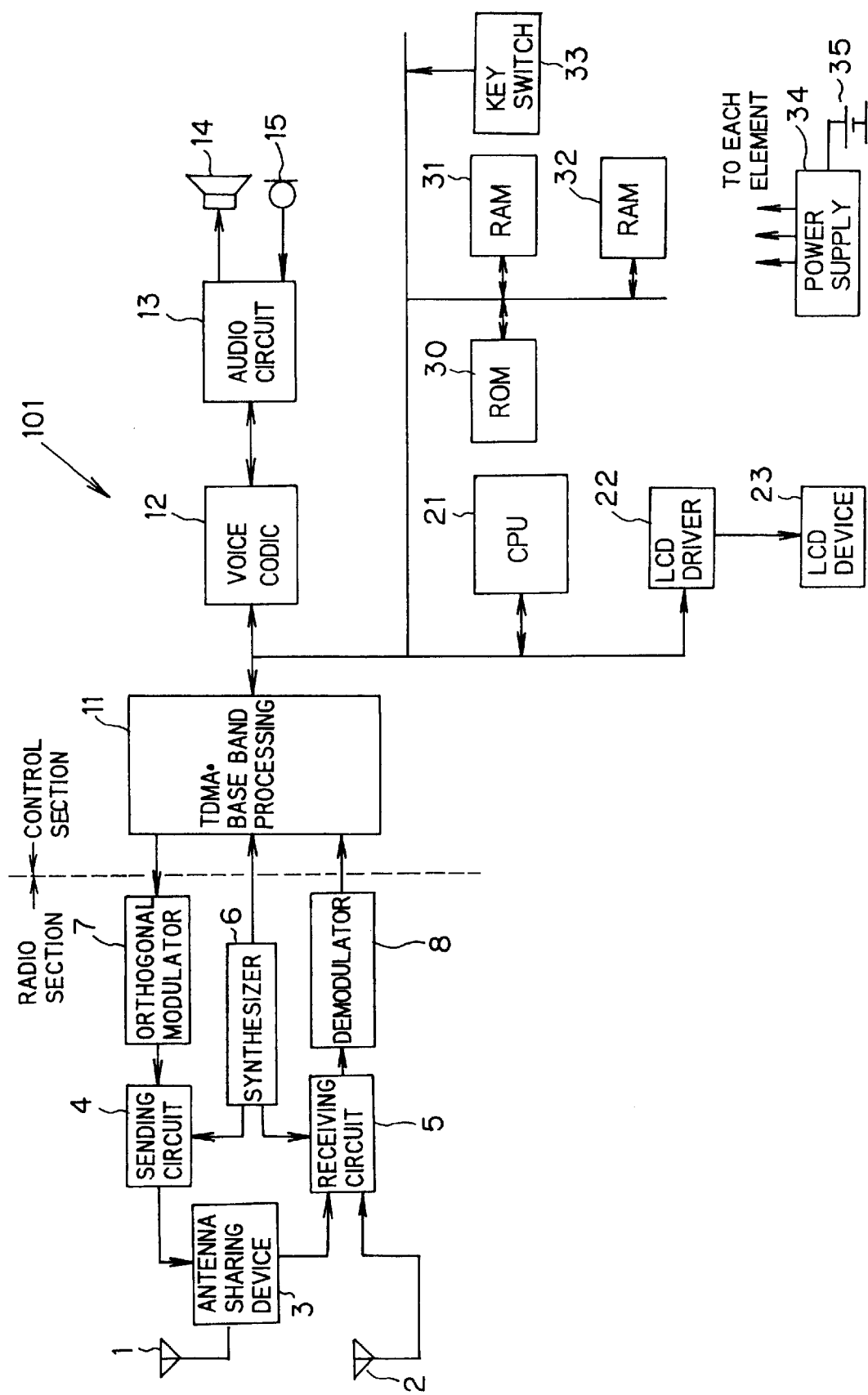
FIG. 4 is a block diagram showing a configuration of a portable telephone apparatus which the stock information presentation system in FIG. 1 contains.

FIG. 4 shows a detailed configuration of the portable telephone apparatus 101.

In FIG. 4, the portable telephone apparatus 101 has a radio section and a control section.

The radio section of the portable telephone apparatus 101 is provided with a sending and receiving antenna 1, an exclusively receiving antenna 2, an antenna sharing device 3, a sending circuit 4, a receiving circuit 5, a synthesizer 6, an orthogonal modulator 7 and a demodulator 8.

The sending and receiving antenna 1 is an antenna for sending and receiving a radio wave which carries the various data, such as the stock information data from the data server 301 when receiving the information presentation, and the voice signal when telephoning another portable telephone apparatus. The exclusively receiving antenna 2 is an antenna dedicated to receive the radio wave of calling the pertinent portable telephone apparatus 101 or to receive the stock information data from the data server 301. The antenna sharing device 3 performs the isolation between a sending wave and a receiving wave in the sending and receiving antenna 1. The orthogonal modulator 7 is a device for orthogonally modulating the sending signal to be sent through the public line network 201. The sending circuit 4 is a circuit for generating the sending wave based on the orthogonally modulated sending signal. The receiving circuit 5 is a circuit for extracting the receiving wave received by the sending and receiving antenna 1 or the exclusively receiving antenna 2 to thereby amplify and reshape it. The demodulator 8 is a device for demodulating the receiving wave received as mentioned above. The synthesizer 6 is a section for performing a local oscillation so as to define a frequency of the radio wave to be sent or received.

The radio section of the portable telephone apparatus 101 constitutes one example of a terminal side transmitting device for transmitting the industry division code and the classified company stock code which are inputted or specified by an LCD device 23 and a key switch 33 (described later), through the public line network 201 to the data server 301 after connected to the data server 301 through the public line network 201. Moreover, it constitutes one example of a terminal side receiving device for receiving the stock information data transmitted from the data server 301.

The control section of the portable telephone apparatus 101 is composed of a TDMA base band processing section 11, a voice codic 12, an audio circuit 13, a speaker 14, a microphone 15, a CPU 21, an LCD driver 22, the LCD device 23, an RAM 30, a first RAM 31, a second RAM 32, the key switch 33, a power supply section 34 and a battery 35.

The TDMA base band processing section 11 generates a time division signal by the TDIA method from the voice signal inputted by the voice codic 12 or the various information signals inputted from the CPU 21 and the like to thereby output it to the orthogonal modulator 7, and also applies a receiving process to the demodulation signal from the demodulator 8 by the TDMA method. The TDMA base band processing section 11 further specifies a frequency of the radio wave in relation to the sending and receiving operation of the synthesizer 6. The speaker 14 outputs to air a voice corresponding to a voice signal transmitted from a partner when telephoning. The microphone 15 picks up from the air the voice transmitted to the partner to thereby generate the voice signal. The audio circuit 13 outputs to the speaker 14 an analog voice signal having a level and a wave form which the speaker 14 can output, and also amplifies the weak analog voice signal from the microphone 15 to a predetermined level to thereby reshape it. The voice codic 12 converts the analog voice signal from the audio circuit 13 into a digital voice signal and compression-processes it. Moreover, the voice codic 12 is a circuit for expanding the compressed digital voice signal from the TDMA base band processing circuit 11 and also converts it into an analog voice signal.

The ROM 30 is a memory device for storing a program of controlling the whole control section of the portable telephone apparatus 101, company name data corresponding to the respective classified company stock codes and the like, irrespective of an on/off state of the power supply section. The CPU 21 controls the whole control section of the portable telephone apparatus 101, based on the program stored in the ROM 30. The LCD device 23 is disposed in front of the portable telephone apparatus 101, and is driven by the LCD driver 22 in various display modes under the control of the CPU 21, and then performs various displays, such as a display of a ten key, a display of a telephone number, a display of stock information data and the like.

A first RAM 31 constitutes one example of a first memory device for storing the stock information data which are sent and received by the data server 301. In this embodiment, the LCD device 23 is especially driven by the LCD driver 22 so as to display the stock information data once stored in the first RAM 31. The second RAM 32 stores the stock information data displayed by the LCD 23 or the data, which is stored in the first RAM 31 and is not displayed, by specifying it by using the input device, such as the key switch 33 and the like, and calls out the stock information data therefrom as the occasion demands. The ROM 30 constitutes one example of a second memory device for storing the company name data corresponding to the classified company stock code. The LCD driver 22 and the LCD device 23 are constructed to display the stock information data together with the corresponding company name data, on the basis of the company name data stored in the RAM 30.

The key switch 33 constitutes one example of the input device together with the LCD device 23, and it is constituted such that the user can input and specify the various information, as described later. The battery 35 is a charging type or a throwaway type of a battery, and can be detached and replaced. The power supply section 34 receives the power supply from the battery 35 and sends predetermined power supplies to the devices and respective circuits of the radio section and the control section in the portable telephone apparatus 101.

Configurations of the LCD device 23 and the key switch 33 in the portable telephone apparatus 101 are further explained with reference to FIG. 5.

Figure 5:
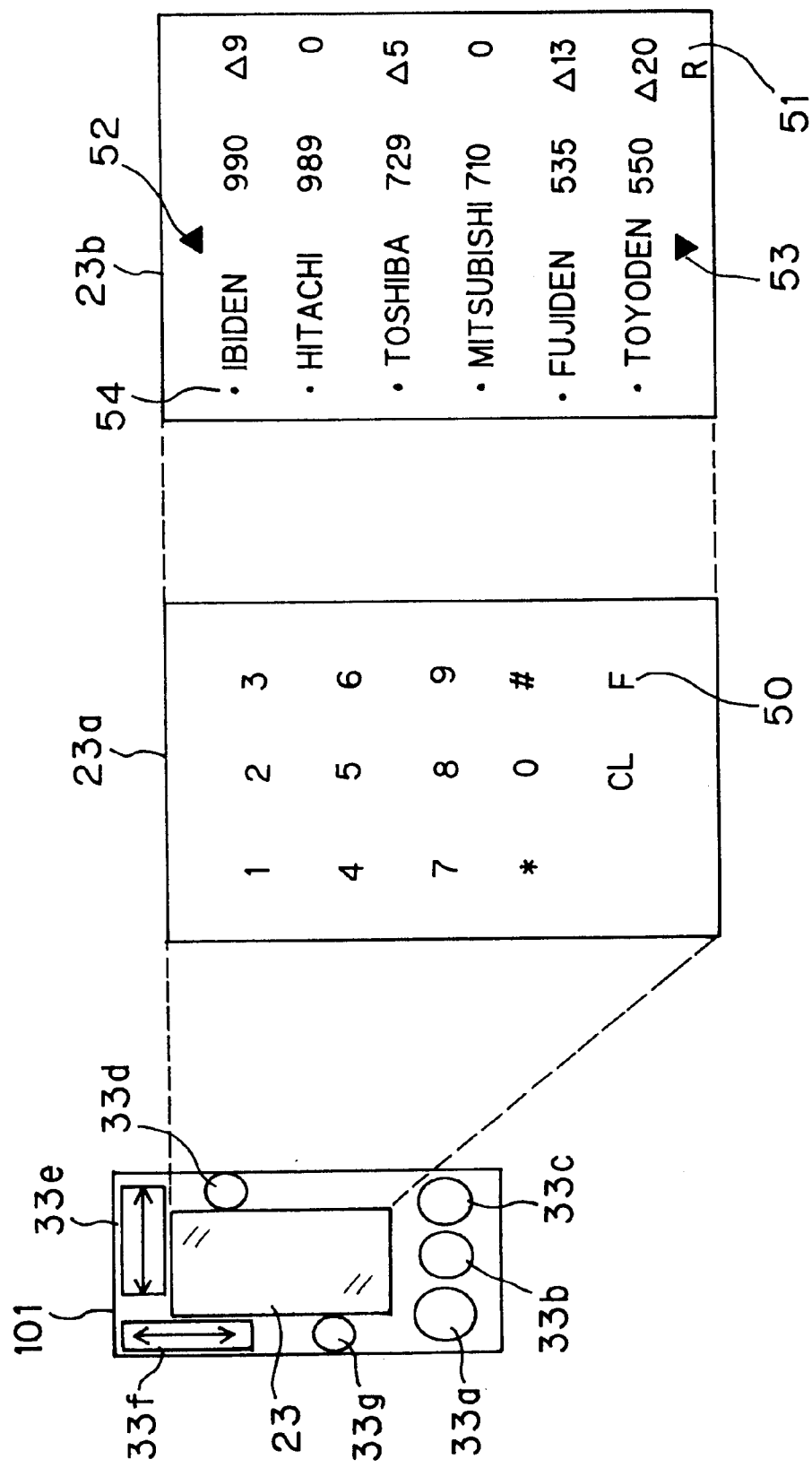
FIG. 5 is a concept diagram showing configurations and operations of an LCD display and a key switch which the portable telephone apparatus in the first embodiment contains.

In FIG. 5, the key switch 33 is composed of: a call key 33a dedicated to call out the data server 301; a memory key 33b to store the stock information data displayed on the LCD device 23 into the second RAM 32 or calling out image information from the second RAM 32; a call key 33c for calling the telephone number under the display; a line cutoff key 33d for cutting off the line connection to the data server 301 or the line connections to other portable telephone apparatuses; a scroll key 33e for scrolling the displayed stock information data in left and right directions on a screen; a scroll key 33f for scrolling the displayed stock information data in upper and lower directions on the screen; and a marking key 33g for putting a predetermined mark on any position on the stock information data displayed by the LCD device 23. The call key 33a is adapted such that a color is changed during the line connection (for example, from green to red).

The LCD device 23 performs a display as shown in a display screen 23a in FIG. 5 in a ten key display mode. That is, the LCD driver 22 and the LCD device 23 are constructed such that the display is performed as shown in the display screen 23a in FIG. 5 in the ten key display mode under the control of the CPU 21, and then a number, such as a desirable telephone number or the like, can be inputted by means of a cursor moving method or a touch panel method. On the other hand, the LCD driver 22 and the LCD device 23 are constructed such that, as one example of a displaying device, a display is performed as shown in a display screen 23b in FIG. 5 in a stock information display mode and the stock information data transmitted by the data server 301 are displayed.

In the ten key display mode, an "F" key 50 on the display screen 23a is a display mode change key. An operation of the "F" key 50 switches from the ten key display mode to the stock information display mode.

In the stock information display mode, company names about six companies belonging to the electrical apparatus division, the most recent or present stock price and the daily return are displayed as characters on the display screen 23b. A "•" mark 54 displayed on a left side of the company name indicates that a brand on which this mark 54 is put is the marginally traded stock. On the display screen 23b, an "R" key 51 is a display mode change key. An operation of the "R" key 51 switches from the stock information display mode to the ten key display mode. A top scroll key 52 and a bottom scroll key 53 are touch panel type keys for scrolling the display for each six companies in an order of increasing or decreasing the classified company stock codes, and has a function similar to that of the machine type scroll key 33f disposed on a body of the portable telephone apparatus 101. In addition to the above mentioned display modes, various display modes, such as a telephone list display mode, an address book mode and the like, can be also employed by adding or changing the program stored in the RAM 30. Although the company name is displayed by using 10 characters at the maximum in the example shown on the display screen 23b, it is allowable to display by using more or less than 10 characters (for example, "MITSU" instead of "MITSUBISHI"). This case has a merit of reducing an area to display the company name display in a limited display screen, while, in a case of company names which belong to the same industry division or whose classified company stock codes are consecutive, it is possible to sufficiently identify them even by using the small number of characters.

FIG. 5 shows the display example for the electrical apparatus division. However, if the portable telephone apparatus 101 specifies a different industry division code or a different classified company stock code in the ten key display mode or the like, the different industry division or company stock information is similarly displayed. At this time, the portable telephone apparatus 101 may be constructed such that the touch panel type key in the ten key display mode is used to input the industry division code or the classified company stock code directly with numerals, the industry or company name may be typed with the characters, or the menu-displayed industry or company name may be specified with a cursor or the like to thereby specify the code corresponding to the industry or company name indirectly. This inputted or specified industry division code or classified company stock code is transmitted through the communication line 201 to the data server 301. The industry division code or the classified company stock code, which is inputted or specified after the connection through the communication line 201, may be transmitted through the communication line 201 to the data server 301. Thus, the stock information about all the companies belonging to one industry division can be collectively obtained from the data server 301 in FIG. 2 or the data server 301 in FIG. 3 by inputting or specifying only the industry division code. Alternatively, the stock information about an individual company belonging to one industry division or a plurality of industry divisions can be collectively obtained from the data server 301 in FIG. 2 or the data server 301 in FIG. 3 by inputting or specifying an individually classified company stock code. Moreover, by inputting or specifying two classified company stock codes, the stock information about companies corresponding to these codes or companies corresponding to codes between these two codes can be collectively obtained from the data server 301 in FIG. 2 or the data server 301 in FIG. 3. In this manner, various request ways for the stock information data are possible according to this embodiment.

A constitution described below may be possible. That is, in any of the display modes, a telephone number to be called by a telephone function is displayed at an appropriate position on a screen. Then, an operation of the call key 33c under the above mentioned state calls the displayed telephone number. In this case, it is possible to telephone a transaction department of a stock company immediately after looking at a current stock price on the display screen, so that it is very convenient for a user.

In FIGS. 1 to 5, especially in this embodiment, after the connection to the data server 301 through the public line network 201, the CPU 21 controls the radio section so that memory ability information, which indicates a memory ability of the first RAM 31, is further transmitted to the data server 301 through the public line network 201. When this memory ability information is transmitted through the public line network 201, the control section 313 of the data server 301 adjusts an amount of the stock information data transmitted on the basis of the memory ability indicated by the transmitted memory ability information. For example, although the stock information data about all companies belonging to one industry division is requested, if a memory capacity of the first RAM 31 has only enough space for the stock information data of approximate half of the companies, the approximate half of the requested stock information data is transmitted at first. Then, after an information request instruction based on the scroll operation of the user or the like is transmitted from the portable telephone apparatus 101, the remaining half of the data is transmitted. Alternatively, while the aforementioned detailed information, such as the moving average value, the PER, the PBR and the like, is requested in addition to the most recent stock price and the daily return, if the memory capacity of the first RAM 31 has not enough space for the detailed information, the detailed information is omitted from a subject of the transmission, and thereby only the basic stock information data corresponding to the classified company stock code of the request is transmitted. On the other hand, if only the stock information data corresponding to only one classified company stock code is requested, the stock information data about the company corresponding to the code is transmitted with the detailed information. The editing method for the stock information data to be transmitted as mentioned above is suitably changed by the control section 313 of the data server 301 on the basis of the requested data amount, the ability of the first RAM 31 and the like.

Incidentally, without transmitting the above mentioned memory ability information, a pre-standardized memory ability value of the first RAM 31 assembled in the portable telephone apparatus 101 may be set in the control section 313 of the data server 301 to thereby determine an amount of the transmitted stock information data on the basis of the set value. Moreover, it is allowable to define the pre-standardized memory ability value as a default value in advance to thereby change the value suitably when receiving the transmission of the memory ability information.

The first RAM 31 preferably has a memory capacity of storing more stock information data than that for an amount which the LCD device 23 can display at a time. Then, it is desirable that the LCD device 23 scroll-displays a portion specified by scroll keys 52 and 53 (or the scroll keys 33e and 33f), among the stock information data stored in the first RAM 31. Moreover, it is possible to use the key switch 33 and the like to instantly display the data of the desired company among the stock information data stored in the first RAM 31, or it is possible to perform a fast sending and fast returning operation to quickly look for the data of the desired company, or it is possible to store the data of the particular company into the second RAM 32 to thereby see a time change of the stock information. If the portion scroll-specified by the scroll keys 52 and 53 (or, the scroll keys 33e and 33f) exceeds a range of the stock information data stored in the first RAM 31, an information request instruction to request the stock information data including the stock information data in the exceeded range may be transmitted instead of the code, from the portable telephone apparatus 101 to the data server 301, and then the stock information data in the exceeded range may be read in from the database 302a, 302b, . . . through the public line network 201, to thereby display it on the LCD device 23.

As mentioned above, it is desirable that the control section 313 of the data server 301 changes the ways of editing and transmitting the stock information data to be transmitted, based on the memory ability of the first RAM 31, the data amount of the stock information data desired by the user and the like, edits it so as to meet with the user's desire if possible and effectively utilize the memory capacity of the first RAM 31, and then transmits it at a predetermined format.

Since the stock information data originally requested by the user calling the data server 301 can be obtained at a point when the stock information data is stored in the first RAM 31, the line connection to the data server 301 through the public line network 201 may be cut off by the control of the CPU 21 at this point. Alternatively, this line connection may be cut off, assuming that the necessary stock information data is obtained when the necessary stock information data and the like are stored into the second RAM 32 by the operation of the memory key 33b, after an intercommunication of obtaining additional stock information data or detailed information data is performed after the line connection. In addition to it or instead of it, when the input of the user through the key switch 33 or the screen of the LCD device 23 is not performed for a predetermined time period, the line connection to the data server 301 may be cut off by the control of the CPU 21. Or, when the receiving control section 311 does not receive a predetermined kind of information from the portable telephone apparatus 101 for a predetermined time period, the line connection to the portable telephone apparatus 101 may be cut off by the control of the control section 311, on the side of the data server 301. Moreover, even after such a line connection is cut off, it is allowable that the LCD device 23 continues the display. The above mentioned configuration is advantageous since the user can continue to see on the LCD device 23 the read stock information data, such as the most recent stock price, the daily return and the like, while the utilization time of the public line network 201 or the data server 301 is shortened.

Again in FIG. 1, especially in this embodiment, a charging device for charging the utilization fee of the public line network 201 and charging the presentation fee of the stock information data to the portable telephone apparatus 101 instead of the data server 301 is disposed in the telephone station 201c. Thus, according to the stock information presentation system of this embodiment, when the portable telephone apparatus 101 is connected to the data server 301 through the telephone station 201c, the line utilization fee is charged by the charging device in the telephone station 201c. Then, when the stock information data is transmitted from the data server 301 through the telephone station 201c to the portable telephone apparatus 101, the presentation fee of the stock information data is charged to the portable telephone apparatus 101 instead of the data server 301, by the charging device in the telephone station 201c.

Figure 6:
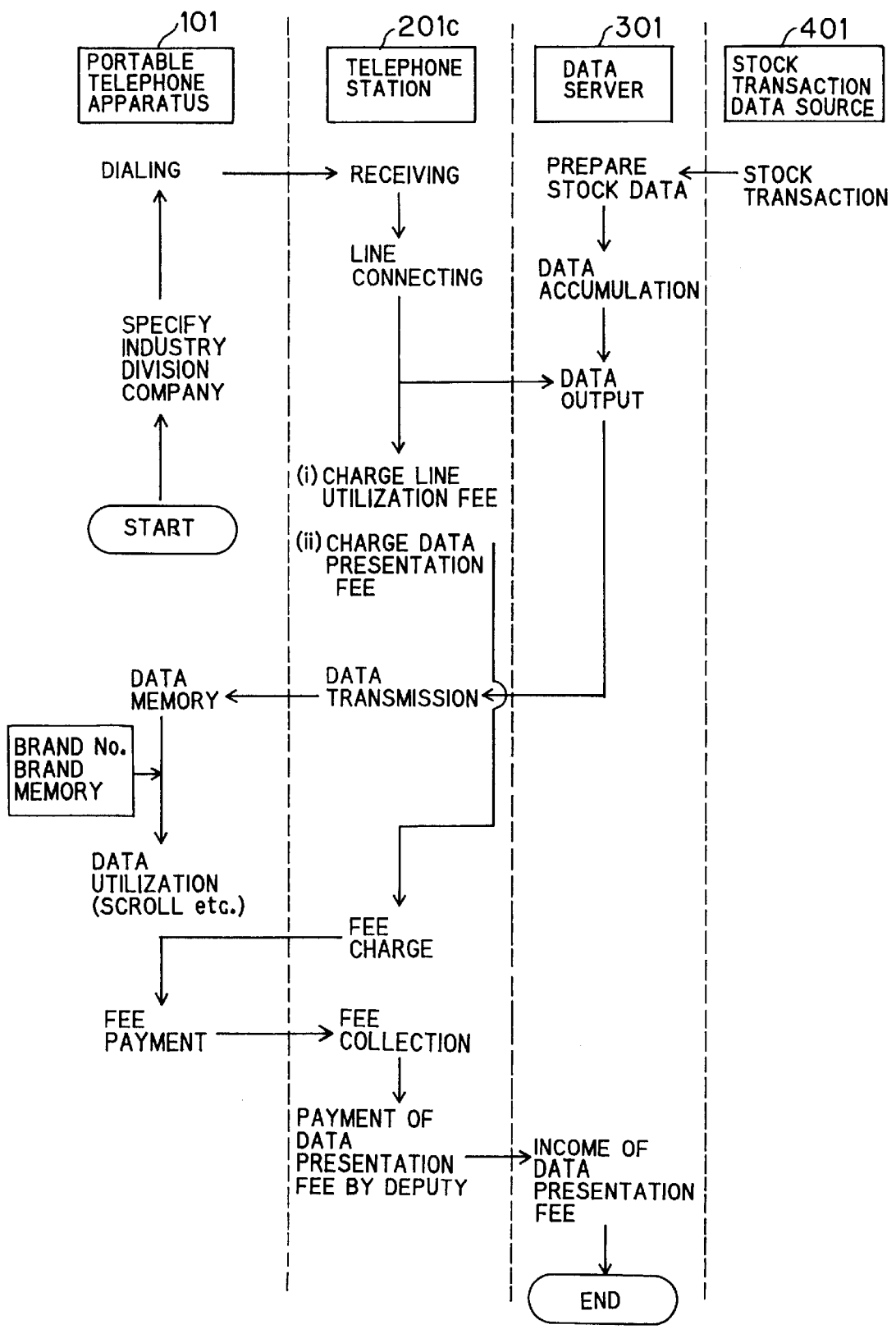
FIG. 6 is a concept diagram explaining operations performed by each of the portable telephone apparatus, a telephone station, the data server and a stock transaction data source, by indicating the time sequence by using arrows in the first embodiment.

Next, an operation of the embodiment having the above mentioned configuration is explained with reference to a system conception diagram in FIG. 6 together with FIG. 5. FIG. 6 is the conception diagram showing the operations respectively performed in the portable telephone apparatus 101, the telephone station 201c, the data server 301 and the stock transaction data source 401, in which the time sequence is represented by arrows.

At first, the touch panel type ten key of the LCD device 23 which is now in the ten key display mode is actuated by the user, in the portable telephone apparatus 101, so that a desired industry division code or classified company stock code is specified. Moreover, the key switch 33 is actuated, so that a request preparation for the stock information data is ready.

Next, in the portable telephone apparatus 101, the call key 33a is actuated, so that the dialing operation is performed to the data server 301. At this time, in a case of the data server 301 shown in FIG. 2, the dialing operation is performed to the telephone number assigned to the database about the industry division corresponding to the specified industry division code or the industry division to which the company corresponding to the specified classified company stock code belongs. On the other hand, in a case of the data server 301a shown in FIG. 3, the dialing operation is performed to the telephone number peculiar to the data server 301a, regardless of the specified industry division code or classified company stock code.

On the other hand, the stock transaction data source 401 provides the actual stock transaction data in the stock exchange market to the data server 301 at a substantially real time.

Then receiving it, the data server 301 prepares the stock information data, which is accumulated in the stock information database as the updated data.

When the telephone station 201c receives dialing from the portable telephone apparatus 101, the telephone station 201c establishes the line communication between the portable telephone apparatus 101 and the data server 301.

When the line is connected, the stock information data as for the company corresponding to the industry division code or the classified company stock code sent by the portable telephone apparatus 101 is searched from the accumulated stock information database by the data server 301, and it is data-outputted (transmitted) to the public line network 201.

The telephone station 201c transmits the stock information data outputted by the data server 301 to the portable telephone apparatus 101. In parallel to this data-sending operation, the telephone station 201c charges (1) the line utilization fee to the portable telephone apparatus 101 by using the charging device, similarly to the case of the normal portable telephone, and charges (2) the data presentation fee to the portable telephone apparatus 101, instead of the data server 301, by using the charging device.

When receiving the desired stock information data sent through the telephone station 201c from the data server 301, the portable telephone apparatus 101 stores it into the data memory (the first RAM 31 in FIG. 4) at first. Then, a brand memory (the RAM 30 in FIG. 4) for storing the company name data corresponding to the respectively classified company stock codes is referred to, so that the received stock information data is utilized. That is, the stock information display such as the display screen 23b in FIG. 5 is performed by actuating the display mode change key 50, the scroll keys 52 and 53 and the like. Moreover, the necessary stock information data is stored into the data memory (the second RAM 32 in FIG. 4) by actuating the memory key 33b and the like.

On the other hand, the telephone station 201c charges the line utilization fee and the data presentation fee, which is charged by deputy, to the portable telephone apparatus 101.

When the fee is paid as for the portable telephone apparatus 101 associated with the charging operation, the fee collection is performed at the telephone station 201c. The data presentation fee collected by deputy is paid to the data server 301 after a deputy commission and the like are subtracted.

As a result of the above mentioned process, the data server 301 can obtain the data presentation fee from the user of the portable telephone apparatus 101 through the telephone station 201c.

As mentioned above, according to the first embodiment, without installing a large scale of a stock information database in the portable telephone apparatus 101, it is possible to establish the line connection to the data server 301 through the public line network 201 suitably as the occasion demands, and then transmit the industry division code and the classified company stock code to thereby obtain the desired most recent or present stock information quickly. Moreover, since the memory ability of the first RAM 31 is transmitted to the data server 301 and thereby the stock information data suitable for the memory ability is transmitted, a free degree of a performance selection for the first RAM 31 is extremely increased. Hence, this is very preferable in apparatus manufacture and utilization.

Second Embodiment

Next, a second embodiment of the present invention will be explained with reference to FIGS. 7 to 11. In FIGS. 7 to 11, same constitutional elements as those in the first embodiment shown in FIGS. 1 to 6 carry the same reference numerals and the detailed explanations thereof are omitted.

Figure 7:
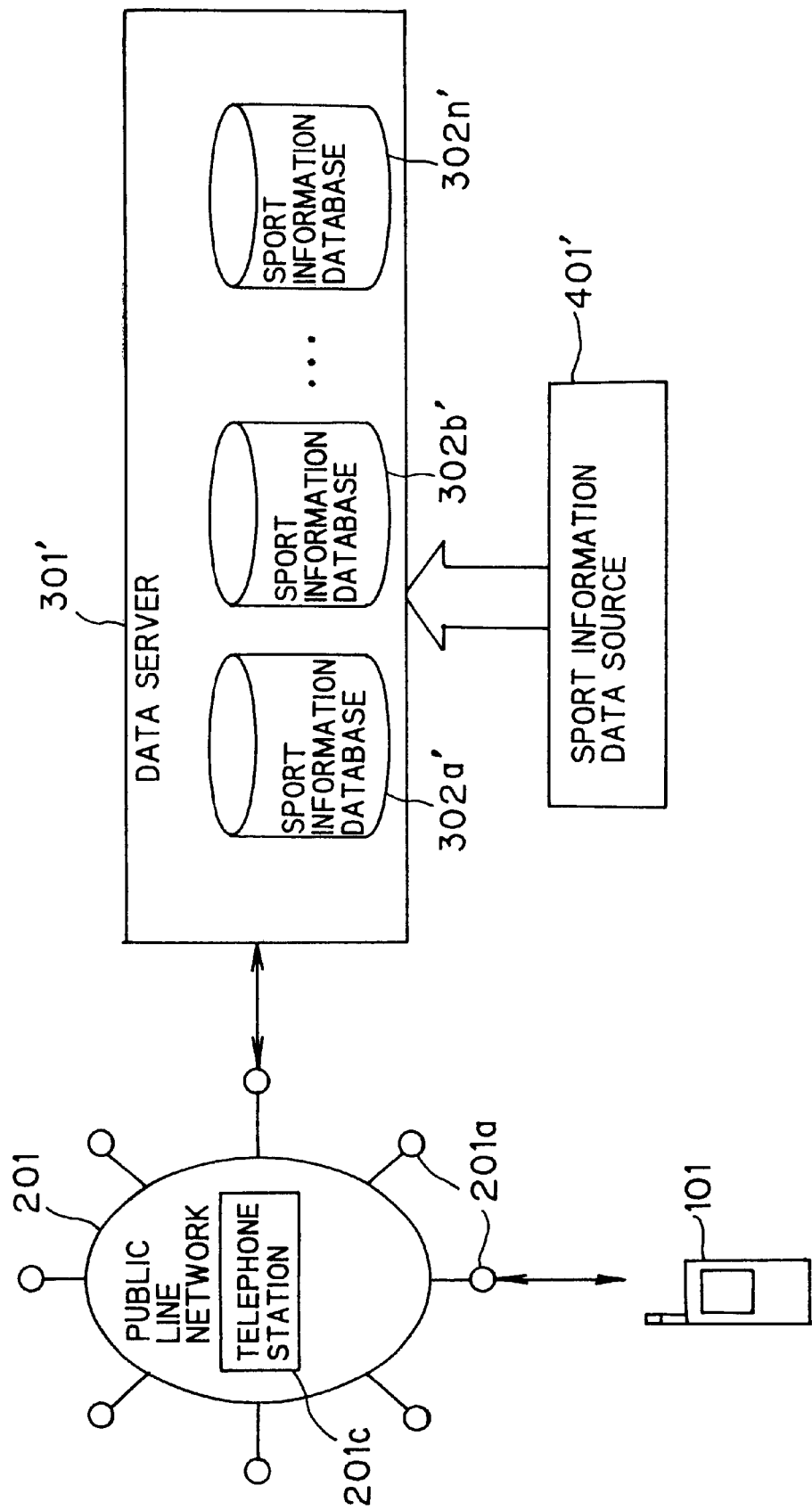
FIG. 7 is a block diagram showing a schematic configuration of a stock information presentation system of a second embodiment.

FIG. 7 is a schematic block diagram of a sport information presentation system as a second embodiment.

In FIG. 7, the sport information presentation system is provided with the portable telephone apparatus 101 as one example of a portable communication terminal apparatus, a data server 301' connected to the portable telephone apparatus 101 through the public (telephone) line network 201 as one example of a communication line.

The portable telephone apparatus 101 is especially constructed to be capable of sending to the data server 301' any code of a plurality of sport genre codes each indicating respective one of sport genres and any code of a plurality of item codes each indicating respective one of the predetermined types of items, after the portable telephone apparatus 101 is connected to the data server 301' through the public line network 201. And, the portable telephone apparatus 101 is provided with a small display, such as an LCD and the like, which can display the sport information data transmitted from the data server 301' based on the above mentioned code.

The data server 301' has a plurality of sport information databases 302a', 302b', ... and 302n' composed of sport information data. They are composed of the sport information data classified for each predetermined kind of a sport genre, respectively. For example, the sport information database 302a' is composed of sport information data about "baseball". The sport information database 302b' is composed of sport information data about "golf". Sport information about a card or game scheduled in each of sport stadiums or a result of a played card or game is sent from a sport information data source 401' through the public line network 201 to the data server 301' at a substantially real time.

Figure 8:
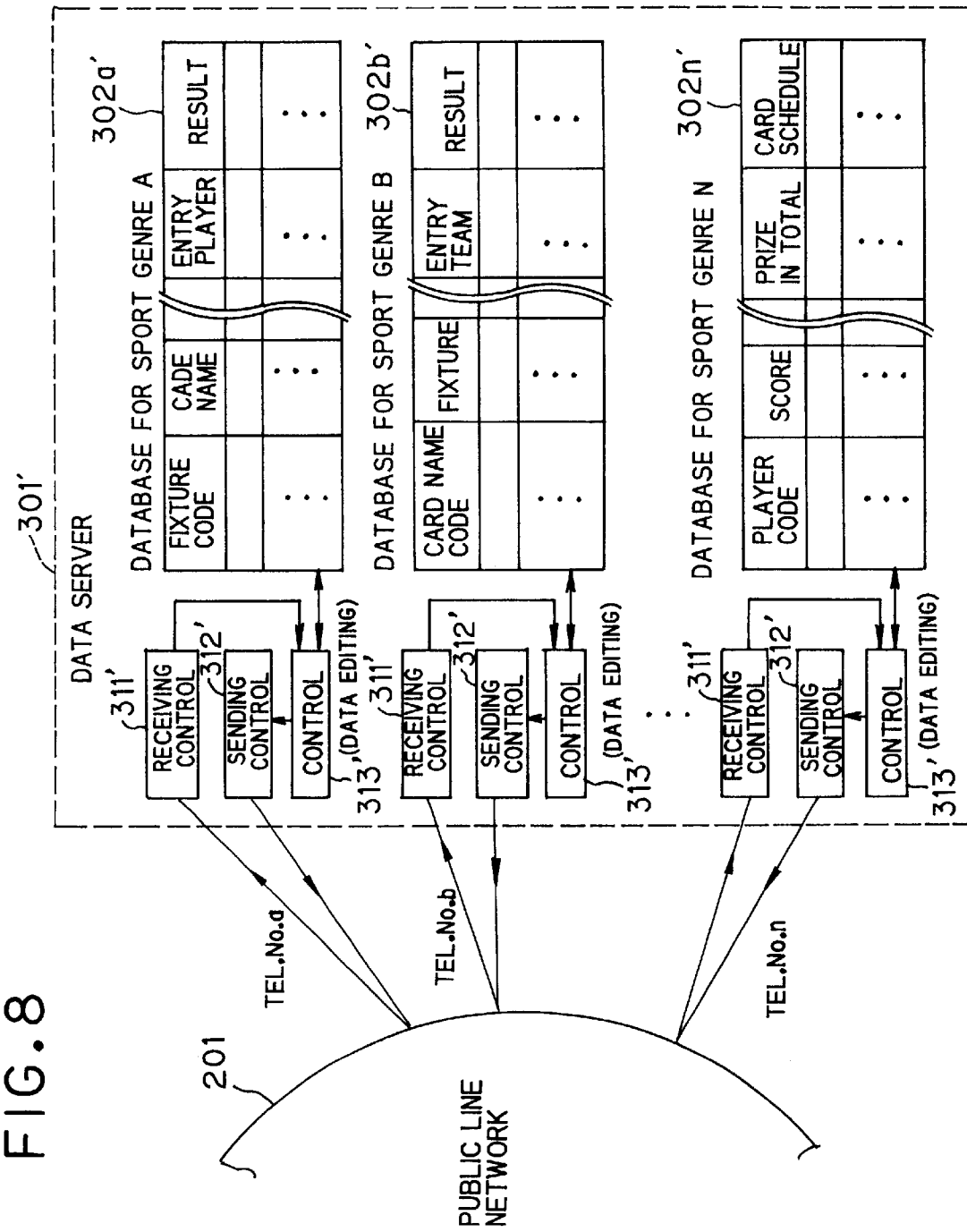
FIG. 8 is a block diagram showing one example of a configuration of a data server which the stock information presentation system in FIG. 7 contains.

FIG. 8 shows one example of a detailed configuration of the data server.

In FIG. 8, the data server 301' is provided with a plurality of sport information databases 302a', 302b', ... and 302n' categorized for respective sport genres such as a baseball, a golf, a SUMO wrestling and so on, to which respectively different telephone numbers a to n are assigned. Moreover, the data server 301' is provided for each database, with: a receiving control section 311' for receiving the information, such as item codes including at least one of a plurality of fixture codes indicating fixtures (dates of cards or games) respectively, a plurality of card name codes indicating card or game names respectively, a plurality of player name codes indicating names of players respectively, a plurality of team name codes indicating names of teams respectively, a plurality of detail genre codes indicating detail genres respectively which categorizes each sport genre mode finely, and the like, which are sent through the public line network 201 by the portable telephone apparatus 101; a control section 313' for extracting the sport information data about the item corresponding to the received item code from the sport information databases 302a', 302b', ... and 302n', and then editing it by a predetermined format; and a sending control section 312' for sending the edited sport information data through the public line network 201 to the portable telephone apparatus 101. Then called at the telephone number a, the receiving control section 311', the sending control section 312' and the control section 313' are actuated which correspond to the database 302a' of a sport genre A. When called at the telephone number b, the receiving control section 311', the sending control section 312' and the control section 313' are actuated which correspond to the database 302b' of a sport genre B. When called at the telephone number n, the receiving control section 311', the sending control section 312' and the control section 313' are actuated which correspond to the database 302n of a sport genre N. In the present embodiment, one example of the server side receiving device is constituted of the receiving control section 311', one example of the server side transmitting device is constituted of the control section 313' and the sending control section 312'.

As shown in FIG. 8, the sport information database 302a' includes a plurality of fixture codes each indicating the date on which each card or game in the sport genre A is held, and card or game name information, entry player information, game result information and the like, which correspond to each of these fixture codes. The sport information database 302b' includes a plurality of card name codes indicating card or game names in the sport genre B, and fixture information, entry team information, game result information and the like, which correspond to each of these card name codes. The sport information database 302n' includes a plurality of player name codes each indicating a name of respective one of the players in the sport genre N, and score information, prize in total information, card schedule information and the like, which correspond to each of these player name codes.

The various types as mentioned above are possible as a logical configuration and a data content of the database. It is desirable that, as the logical configuration and data content, a structure is employed, which enables quick and easy search of the data, which are likely to be requested by a user (client) from a viewpoint of the respective sport genres. More actually, for example, if the sport genre is "baseball", the database is logically constituted so as to specify a peculiar code constituted by a number of two digits that is set in advance for each of predetermined kinds of items, such as a fixture (a card date), a card name, a player name, a team name (a school name) and the like, and further a plurality of detailed genre codes indicating the more finely categorized detail genres, such as a professional baseball, an amateur baseball, a social baseball, a high-school baseball, a foreign baseball like a major league, a national baseball like a central league and the like, for example, as the item codes. Moreover, for example, the database is constructed such that the game result information indicative of a score, a winning/losing pitcher, a percentage of victories to a total number of games, a rank and the like, and the information as for the game currently in progress, such as a present pitcher name, a score progress and the like, which are related to one particular card, can be searched or retrieved by specifying just the card name code for this particular card. Furthermore, the database is constructed such that the personal information indicative of a batting average, runs batted in, a number of home runs, a winning/losing number, a save point and the like which are related to one particular player can be searched or retrieved by specifying just the player name code for this particular player. As a result, by specifying the above mentioned item codes, the information having the above mentioned contents can be displayed in the portable telephone apparatus.

For example, if the sport genre is "golf", the database is constructed such that the information of a game result or the information for the game currently in progress, such as a rank, a score, a number of birdies/bogeys, a prize money and the like, which are related to one particular game (tournament name) can be searched or retrieved by specifying just the game name code for this particular game. Moreover, for example, the database is constructed such that the personal information, such as a number of entry games, a winning number, a prize money in total and the like, which are related to one particular player, can be searched or retrieved by specifying just the player name code for this particular player. As a result, by specifying the above mentioned item codes, the information having the above mentioned contents can be displayed in the portable telephone apparatus.

For example, if the sport genre is "SUMO wrestling", the database is constructed such that the information of a game result or the information for the game currently in progress, such as a ranking list, an order, and the like, which are related to one particular game (location so called as "BASHO"), can be searched or retrieved by specifying just the game name (location name) code for this particular game. Moreover, for example, the database is constructed such that, by specifying a game date code indicating on what day of the 15 days while the game is held, the competition information indicative of a competition card, a result, a winning trick and the like on the present day. Moreover, the database is constructed such that, by specifying a SUMO wrestler name code for one particular SUMO wrestler, the personal information indicative of a competition card from an opening day, a victory or defeat, a body dimension, a native place and the like, which are related to this particular SUMO wrestler, can be searched or retrieved. As a result, by specifying the abovementioned item codes, the information having the above mentioned contents can be displayed in the portable telephone apparatus.

The database can have variously detailed information corresponding to various item codes, in addition to the above mentioned information.

As described above, the data server shown in FIG. 8 is constructed such that the database for each sport genre can be accessed from the portable telephone apparatus 101 in FIG. 1, by using the different telephone numbers respectively.

Figure 9:
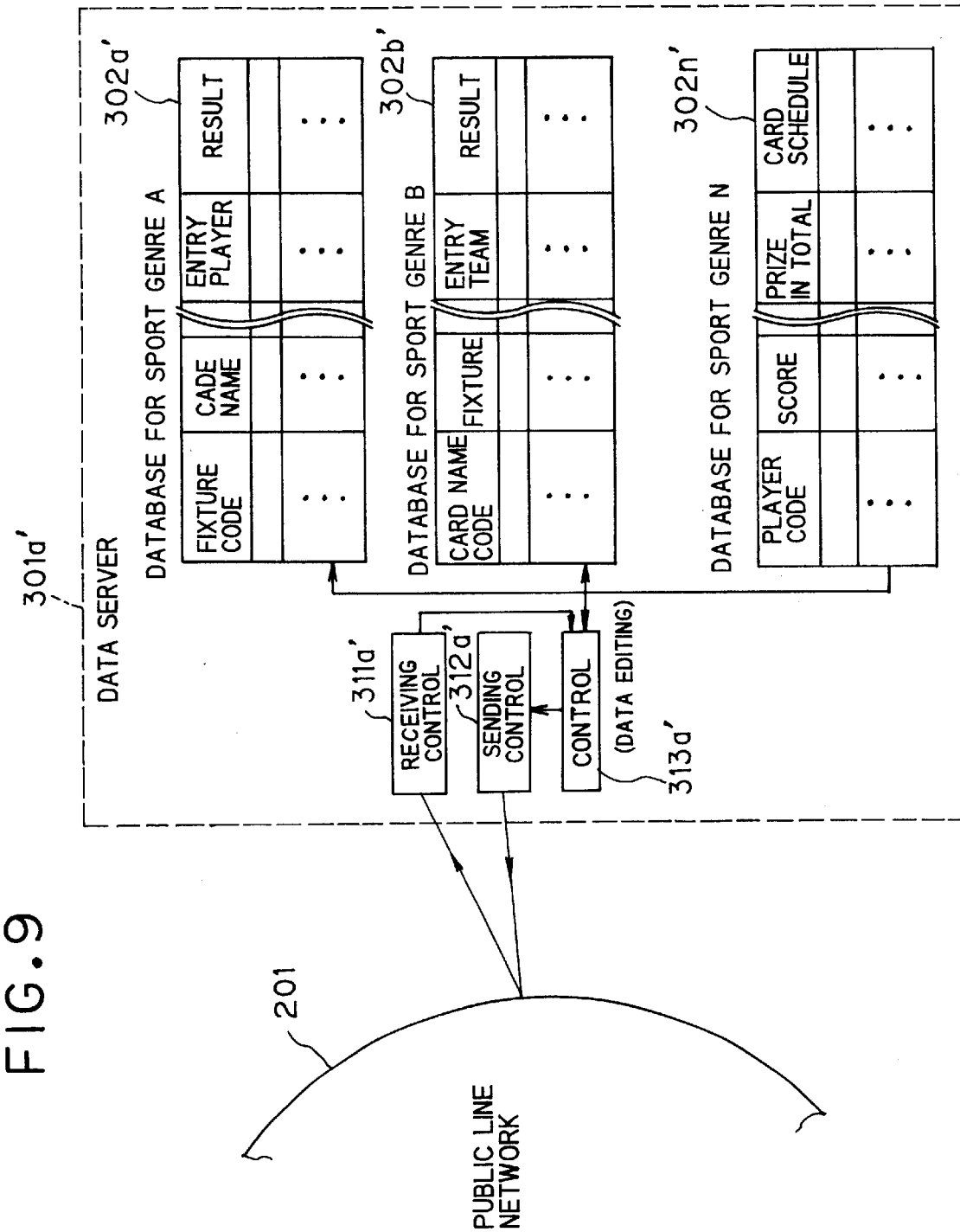
FIG. 9 is a block diagram showing another example of the configuration of the data server which the stock information presentation system in FIG. 7 contains.

FIG. 9 shows another example of the detailed configuration of the data server.

In FIG. 9, although a data server 301a' contains a plurality of sport information databases 302a', 302b', . . . and 302n' similar to those in FIG. 8, it is provided with: a receiving control section 311a' for receiving information, such as a sport genre code, an item code and the like, sent through the public line network 201 from the portable telephone apparatus 101; a control section 313a' for extracting the sport information data corresponding to the received sport genre code or item code from among the sport information databases 302a', 302b', . . . and 302n', and then editing it at a predetermined format; and a sending control section 312a' for sending the edited sport information data through the public line network 201 to the portable telephone apparatus 101. In this manner, only one set of the receiving control section 311a', the control section 313a' and the sending control section 312a' are provided with respect to the databases as a whole. In this example, when called at one telephone number, the portable telephone apparatus 101 and the data server 301a' are then line-connected to each other through the public line network 201. After that, the databases 302a', 302b', . . . and 302n' corresponding to the sport genre code or the item code transmitted by the portable telephone apparatus 101 are accessed by the control section 313a. In the present embodiment, one example of the server side receiving device is constituted of the receiving control section 311a', and one example of the server side transmitting device is constituted of the control section 313a' and the sending control section 312a'.

As described above, the data server 301a' shown in FIG. 9 is constructed such that the portable telephone apparatus 101 in FIG. 7 can access the database for each sport genre by using one telephone number.

A circuit configuration of the portable telephone apparatus 101 of the second embodiment is the same as that in the first embodiment shown in FIG. 4. Thus, an explanation thereof is omitted.

In the second embodiment, especially in FIG. 4, the sending and receiving antenna 1 is adapted to send and receive a radio wave which carries various data such as the sport information data when receiving the information presentation from the data server 301' and the voice signal when telephoning another portable telephone apparatus. The exclusively receiving antenna 2 is adapted to exclusively receive the radio wave of calling the portable telephone apparatus 101 or to receive the sport information data from the data server 101. The radio section of the portable telephone apparatus 101 constitutes one example of the terminal side transmitting device for transmitting the sport genre code and the item code, which are inputted or specified by the LCD device 23 and the key switch 33, through the public line network 201 to the data server 301' after connected to the data server 301' through the public line network 201. Moreover, it constitutes one example of the terminal side receiving device for receiving the sport information data transmitted by the data server 301'.

In the second embodiment, especially in FIG. 4, the ROM 30 stores a program of controlling the whole control section of the portable telephone apparatus 101, sport genre display data to character-display a sport genre corresponding to each of the sport genre codes, item display data to character-display an item corresponding to each of the item codes and the like, irrespective of an on/off state of the power supply section. The LCD device 23 is driven by the LCD driver 22 in the various display modes under the control of the CPU 21, and then performs various displays, such as the display of the ten key, the display of the telephone number, the display of the sport information data and the like. The first RAM 31 constitutes one example of the first memory device for storing the sport information data which is sent and received from the data server 301'. In this embodiment, the LCD device 23 is especially driven by the LCD driver 22 so as to display the sport information data once stored in the first RAM 31. The second RAM 32 stores the sport information data displayed by the LCD 23 or the data, which is stored in the first RAM 31 and is not displayed by the LCD 23, as it is specified by the input device, such as the key switch 33 and the like, and calls out the sport information data therefrom as the occasion demands. The ROM 30 constitutes one example of the second memory device for storing the sport genre display data to character-display the sport genre corresponding to each of the sport genre codes and the item display data to character-display an item corresponding to each of the item codes. The LCD driver 22 and the LCD device 23 display the sport information data together with the corresponding sport genre name (character display such as "baseball" or "golf") and the corresponding item name (character display of a tournament name or a player name), based on the sport genre display data and the item display data stored in the RAM 30.

Figure 10:
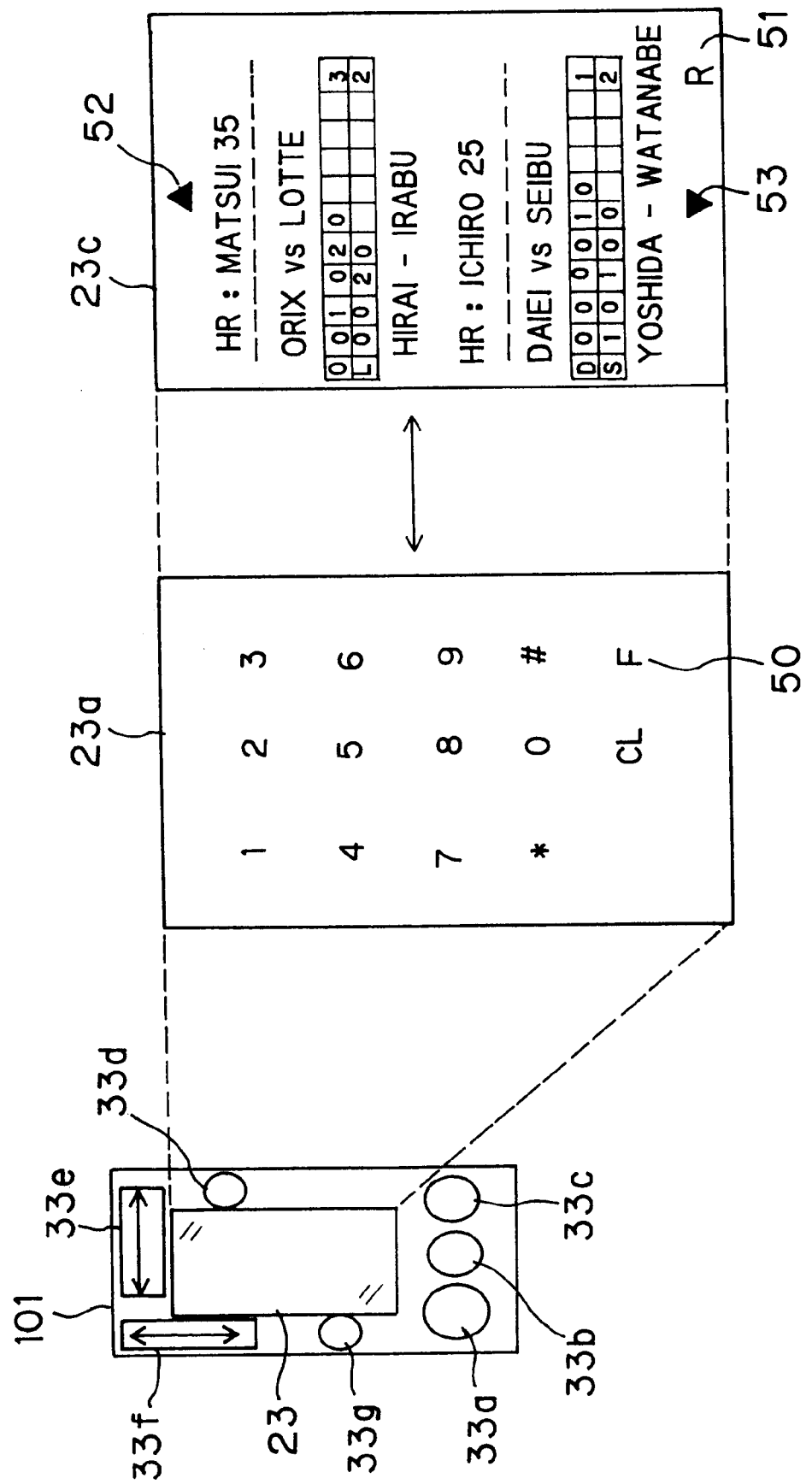
FIG. 10 is a concept diagram showing configurations and operations of an LCD display and a key switch which the portable telephone apparatus in the second embodiment contains.

Configurations of the LCD device 23 and the key switch 33 in the portable telephone apparatus 101 in the second embodiment are further explained with reference to FIG. 10. In FIG. 10, the same constitutional elements as those in FIG. 5 carry the same reference numerals and the explanations thereof are omitted.

In FIG. 10, the memory key 33b is used to store the sport information data displayed on the LCD device 23 and call out the image information from the second RAM 32. The scroll key 33e is used to scroll the displayed sport information data in left and right directions on a screen. The scroll key 33f is used to scroll the displayed sport information data in upper and lower directions on the screen. The marking key 33g is used to put a predetermined mark on any position on the sport information data displayed by the LCD device 23.

The LCD device 23 constitutes one example of the displaying device for performing a display such as a display screen 23c in FIG. 10 and displaying the sport information data transmitted from the data server 301'.

In this embodiment, in the ten key display mode, an operation of the "F" key 50 on the display screen 23a switches from the ten key display mode to the sport information display mode.

On the display screen 23c, a game state currently in progress is displayed as a character and a score board as one example in the sport information display mode when the baseball is specified from the sport genre code and today is specified from the fixture code. In this case, a competition card, a score board, a pitcher, a home run record are displayed for each competition card. The displayed items can be changed by a menu screen. For example, it is possible to simultaneously display scores of more cards by displaying only the competition card and the scores. Moreover, on the display screen 23c, the "R" key 51 is a display mode change key, so that an operation of the "R" key 51 switches from the sport information display mode to the ten key display mode. The top scroll key 52 and the bottom scroll key 53 are touch panel type keys for scrolling these displays, and has a function similar to that of the machine type scroll key 33f disposed on a body of the portable telephone apparatus 101. In addition to the above mentioned display modes, various display modes, such as a telephone list display mode, an address book mode, the stock information display mode explained in the first embodiment and the like can be also employed by adding or changing the program stored in the RAM 30. In the example shown on the display screen 23c, the team names and the like are displayed such that they are not abbreviated. However, it is possible to abbreviate and display the team name and the player name in an identifiable range, for example, in such a way that "ORIX" is "ORI" or "GIANTS" is "G". This case has a merit of reducing an area for the display of the respective information on a limited display screen. Incidentally, a longitudinally arranged order of the competition cards on the scroll-displayed display screen 23c may be constituted such that it is arranged in a time order, an AIUEO order or the like from a top side, or a display order desired by a user may be specified in advance.

FIG. 10 shows the display example for "baseball". However, if the portable telephone apparatus 101 specifies a different sport genre code or a different item code in the ten key display mode or the like, the sport information of the different sport genre (for example "golf" or "SUMO") or item (for example, a future card schedule or a personal record) is displayed at a predetermined format. At this time, in the portable telephone apparatus 101, the touch panel type key in the ten key display mode may be used to input the sport genre code or the item code directly by numerals, the sport genre name or the item name may be typed by the characters, or the menu-displayed sport genre or item name may be specified by a cursor or the like to thereby specify the code corresponding to the sport genre or item name indirectly. This inputted or specified sport genre or item code is transmitted through the communication line 201 to the data server 301'. Incidentally, the sport genre code or the item code, which are inputted or specified after the connection through the communication line 201 is established, may be transmitted through the communication line 201 to the data server 301'. Thus, the sport information as for all the items belonging to one particular sport genre can be collectively obtained from the data server 301' in FIG. 8 or the data server 301a' in FIG. 9 by inputting or specifying just the sport genre code for this particular sport genre. Or, the sport information as for one particular individual item belonging to one or a plurality of sport genres (for example, information indicative of main games about various sports held on "today") can be collectively obtained from the data server 301' in FIG. 8 or the data server 301a' in FIG. 9 by inputting or specifying just the individual item code for this particular individual item. As mentioned above, various request ways for various sport information data are possible according to this embodiment.

A constitution described below may be possible. That is, in any of the display modes, a telephone number to be called by a telephone function is displayed at an appropriate position on a screen. Then, an operation of the call key 33c under the above mentioned state calls the displayed telephone number. In this case, it is possible to make a reservation for a scheduled competition card by telephone immediately after looking at the scheduled competition card on the display screen 23, so that it is very convenient for a user.

In FIGS. 7 to 10, especially in this embodiment, after the connection to the data server 301' through the public line network 201, the CPU 21 controls the radio section so that memory ability information, which indicates a memory ability of the first RAM 31, is further transmitted to the data server 301' through the public line network 201, in the same manner as in the first embodiment. When this memory ability information is transmitted through the public line network 201, the control section 313' of the data server 301' adjusts an amount of the sport information data transmitted on the basis of the memory ability indicated by the transmitted memory ability information. For example, although the sport information data as for all items belonging to one sport genre is requested, if a memory capacity of the first RAM 31 has only enough space for the sport information data of approximate half of the items, the approximate half of the requested sport information data is transmitted at first.

Then, after an information request instruction based on the scroll operation of the user or the like is transmitted from the portable telephone apparatus 101, the remaining half of the data is transmitted. Alternatively, while the aforementioned detailed information as for all cards in the past in the season is requested in addition to that as for the most recent card which is rather small in the data amount, if the memory capacity of the first RAM 31 has not enough space for the detailed information, the detailed information is omitted from a subject of the transmission, and thereby only the basic sport information data corresponding to the sport genre code of the request (e.g., only the win/lose record in the past) is transmitted, or only the detailed information as for the recent game results, which were held within a predetermined term is transmitted. The editing method for the sport information data to be transmitted as mentioned above is suitably changed on the basis of the requested data amount, the ability of the first RAM 31 and the like.

Incidentally, without transmitting the above mentioned memory ability information, a pre-standardized memory ability value of the first RAM 31 assembled in the portable telephone apparatus 101 may be set in the control section 313' of the data server 301' to thereby determine an amount of the transmitted sport information data on the basis of the set value. Moreover, it is allowable to define the pre-standardized memory ability value as a default value in advance to thereby change the value suitably when receiving the transmission of the memory ability information.

The first RAM 31 preferably has a memory capacity of storing more sport information data than that for an amount which the LCD device 23 can display at a time. Then, it is desirable that the LCD device 23 scroll-displays a portion specified by scroll keys 52 and 53 (or the scroll keys 33e and 33f), among the sport information data stored in the first RAM 31. Moreover, it is possible to use the key switch 33 and the like to instantly display the data of the desired item among the sport information data stored in the first RAM 31, or it is possible to perform a fast sending and fast returning operation to quickly look for the data of the desired item, or it is possible to store the data of the particular item into the second RAM 32 to thereby see a time change of the sport information. If the portion scroll-specified by the scroll keys 52 and 53 (or, the scroll keys 33e and 33f) exceeds a range of the sport information data stored in the first RAM 31, an information request instruction to request the sport information data including the sport information data in the exceeded range may be transmitted instead of the code, from the portable telephone apparatus 101 to the data server 301', and then the sport information data in the exceeded range may be read in from the database 302a', 302b', ... through the public line network 201, to thereby display it on the LCD device 23.

As mentioned above, it is desirable that the control section 313' of the data server 301' changes the ways of editing and transmitting the sport information data to be transmitted, based on the memory ability of the first RAM 31, the data amount of the sport information data desired by the user and the like, edits it so as to meet with the user's desire if possible and effectively utilize the memory capacity of the first RAM 31, and then transmits it at a predetermined format.

Since the sport information data originally requested by the user calling the data server 301' can be obtained at a point when the sport information data is stored in the first RAM 31, the line connection to the data server 301' through the public line network 201 may be cut off by the control of the CPU 21 at this point. Alternatively, this line connection may be cut off, assuming that the necessary sport information data is obtained when the necessary sport information data and the like are stored into the second RAM 32 by the operation of the memory key 33b, after an intercommunication of obtaining additional sport information data or detailed information data is performed after the line connection. In addition to it or instead of it, when the input of the user through the key switch 33 or the screen of the LCD device 23 is not performed for a predetermined time period, the line connection to the data server 301' may be cut off by the control of the CPU 21. Or, when the receiving control section 311' does not receive a predetermined kind of information from the portable telephone apparatus 101 for a predetermined time period, the line connection to the portable telephone apparatus 101 may be cut off by the control of the control section 311', on the side of the data server 301'. Moreover, even after such a line connection is cut off, it is allowable that the LCD device 23 continues the display. The above mentioned configuration is advantageous since the user can continue to see on the LCD device 23 the read sport information data, while the utilization time of the public line network 201 or the data server 301' is shortened.

Again in FIG. 7, especially in this embodiment, a charging device for charging the utilization fee of the public line network 201 and charging the presentation fee of the sport information data to the portable telephone apparatus 101 instead of the data server 301' is disposed in the telephone station 201c. Thus, according to the sport information presentation system of this embodiment, when the portable telephone apparatus 101 is connected to the data server 301' through the telephone station 201c, the line utilization fee is charged by the charging device in the telephone station 201c. Then, when the sport information data is transmitted from the data server 301' through the telephone station 201c to the portable telephone apparatus 101, the presentation fee of the sport information data is charged to the portable telephone apparatus 101 instead of the data server 301', by the charging device in the telephone station 201c.

Figure 11:
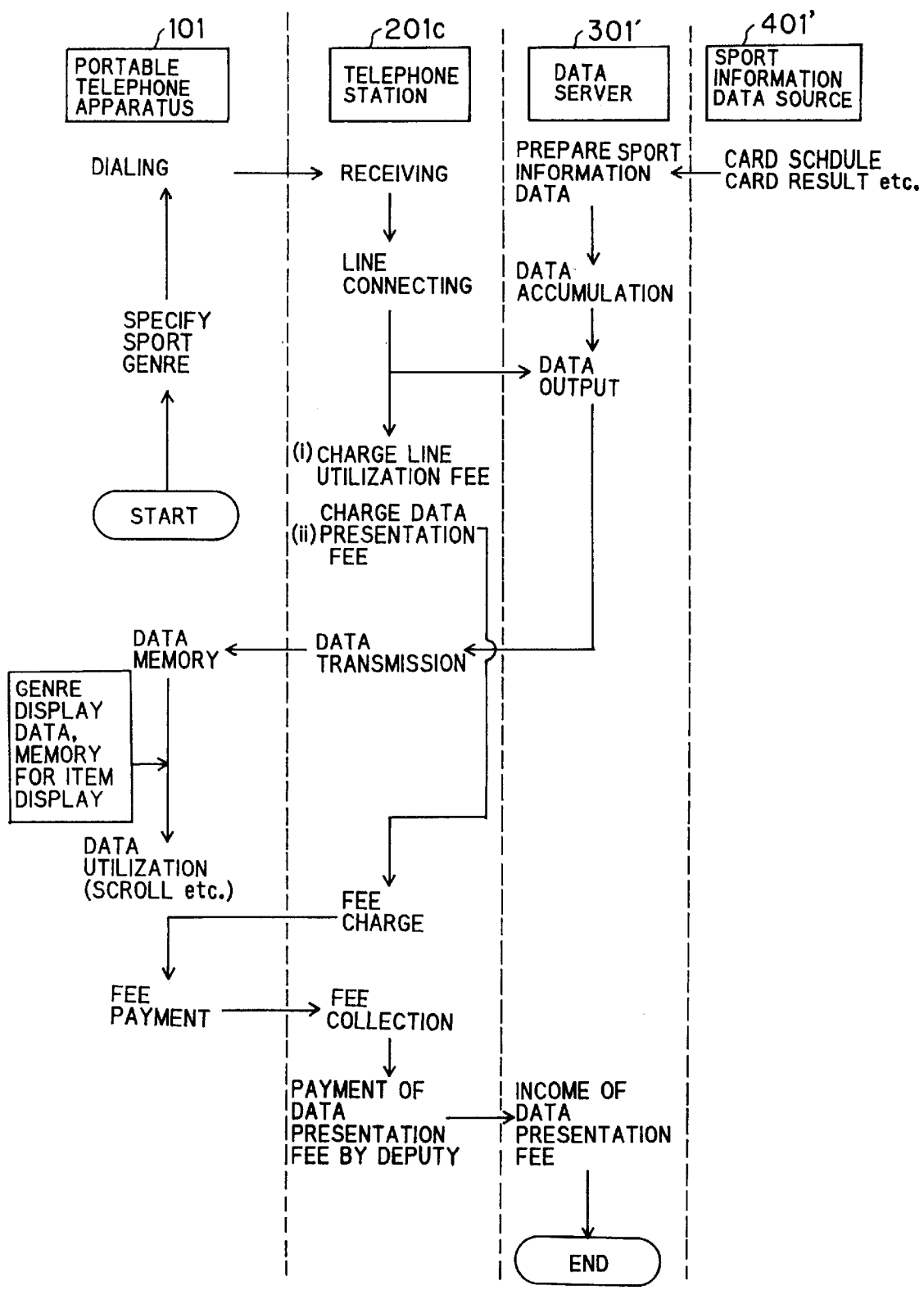
FIG. 11 is a concept diagram explaining operations performed by each of the portable telephone apparatus, a telephone station, the data server and a stock transaction data source, by indicating the time sequence by using arrows, in the second embodiment.

Next, an operation of the second embodiment having the above mentioned configuration is explained with reference to a system conception diagram in FIG. 11 together with FIG. 10. FIG. 11 is the conception diagram showing the operations respectively performed in the portable telephone apparatus 101, the telephone station 201c, the data server 301' and the sport information data source 401', in which the time sequence is represented by arrows.

At first, the touch panel type ten key of the LCD device 23 which is now in the ten key display mode is actuated by the user, in the portable telephone apparatus 101, so that a desired sport genre code, a desired item code or the like is specified. Moreover, the key switch 33 is actuated, so that a request preparation for the sport information data is ready.

Next, in the portable telephone apparatus 101, the call key 33a is actuated, so that the dialing operation is performed to the data server 301'. At this time, in a case of the data server 301' shown in FIG. 8, the dialing operation is performed to the telephone number assigned to the database about the sport genre corresponding to the specified sport genre code. On the other hand, in a case of the data server 301a' shown in FIG. 9, the dialing operation is performed to the telephone number peculiar to the data server 301a', regardless of the specified sport genre or item code.

On the other hand, the sport information data source 401' provides the sport information data in an actual game stadium or the like to the data server 301' at a substantially real time.

When. receiving it, the data server 301' prepares the sport information data, which is accumulated in the sport information database as the updated data.

When the telephone station 201c receives dialing from the portable telephone apparatus 101, the telephone station 201c establishes the line communication between the portable telephone apparatus 101 and the data server 301'.

When the line is connected, the sport information data corresponding to the sport genre code or the item code sent by the portable telephone apparatus 101 is searched from the accumulated sport information database by the data server 301', and it is data-outputted (transmitted) to the public line network 201.

The telephone station 201c transmits the sport information data outputted by the data server 301' to the portable telephone apparatus 101. In parallel to this data-sending operation, the telephone station 201c charges (1) the line utilization fee to the portable telephone apparatus 101 by using the charging device, similarly to the case of the normal portable telephone, and charges (2) the data presentation fee to the portable telephone apparatus 101, instead of the data server 301', by using the charging device.

Then receiving the desired sport information data sent through the telephone station 201c from the data server 301', the portable telephone apparatus 101 stores it into the data memory (the first RAM 31 in FIG. 4) at first. Then, the memory for storing the sport genre display data and the item display data (the ROM 30 in FIG. 4) is referred to, so that the received sport information data is utilized. That is, the sport information display such as the display screen 23c in FIG. 10 is performed by actuating the display mode change key 50, the scroll keys 52 and 53 and the like. Moreover, the necessary sport information data is stored into the data memory (the second RAM 32 in FIG. 4) by actuating the memory key 33b and the like.

On the other hand, the telephone station 201c charges the line utilization fee and the data presentation fee, which is charged by deputy, to the portable telephone apparatus 101.

When the fee is paid as for the portable telephone apparatus 101 associated with the charging operation, the fee collection is performed at the telephone station 201c. The data presentation fee collected by deputy is paid to the data server 301' after a deputy commission and the like are subtracted.

As a result of the above mentioned process, the data server 301' can obtain the data presentation fee from the user of the portable telephone apparatus 101 through the telephone station 201c.

As mentioned above, according to the second embodiment, without installing a large scale of a sport information database in the portable telephone apparatus 101, it is possible to establish the line connection to the data server 301' through the public line network 201 suitably as the occasion demands, and then transmit the sport genre code and the item code to thereby obtain the desired most recent or present sport information quickly. Moreover, since the memory ability of the first RAM 31 is transmitted to the data server 301' and thereby the sport information data suitable for the memory ability is transmitted, a free degree of a performance selection for the first RAM 31 is extremely increased. Hence, this is very preferable in apparatus manufacture and utilization.

Especially, according to the second embodiment, since the data to be transmitted is relatively small in data amount, the memory capacity necessary for the portable telephone is rather small, and that the transmission time is also short. As a result, a user can access the data server with a light heart to thereby utilize the information presentation service. For example, if it can be used at a low cost such as 10 or 20 yens (or, 10 or 20 cents), it is possible to establish one culture in future.

Third Embodiment

A construction of a third embodiment is explained with reference to FIGS. 12 to 16. In FIGS. 12 to 16, the same constitutional elements as those in first or second embodiment carry the same reference numerals, and the detailed explanations thereof are omitted.

Figure 12:
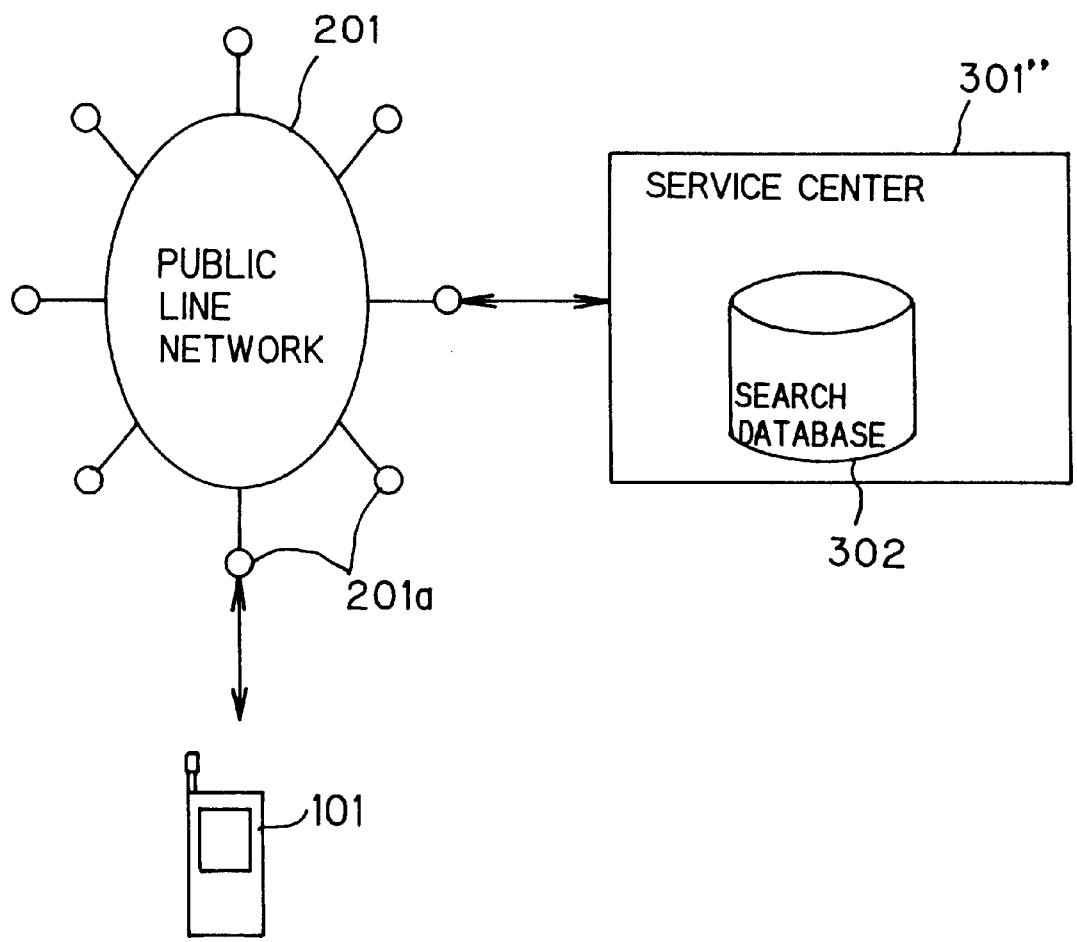
FIG. 12 is a block diagram showing a schematic configuration of a map information presentation system of a third embodiment.

FIG. 12 is a schematic block diagram of a stock information presentation system as a third embodiment.

In FIG. 12, the information presentation system is provided with the portable telephone apparatus 101, and a data server 301" connected to the portable telephone apparatus 101 through the public (telephone) line network 201.

The portable telephone apparatus 101 can send to the data server 301" a desired telephone number after the portable telephone apparatus 101 is connected to the data server 301" through the public line network 201. Moreover, the portable telephone apparatus 101 is provided with the small display, such as an LCD or the like, which can display the map data etc. transmitted by the data server 301" in response.

A service center 301" has a retrieval database 302 having presentation data including map data, and is constructed to provide the presentation data through the public line network 201.

Figure 13:
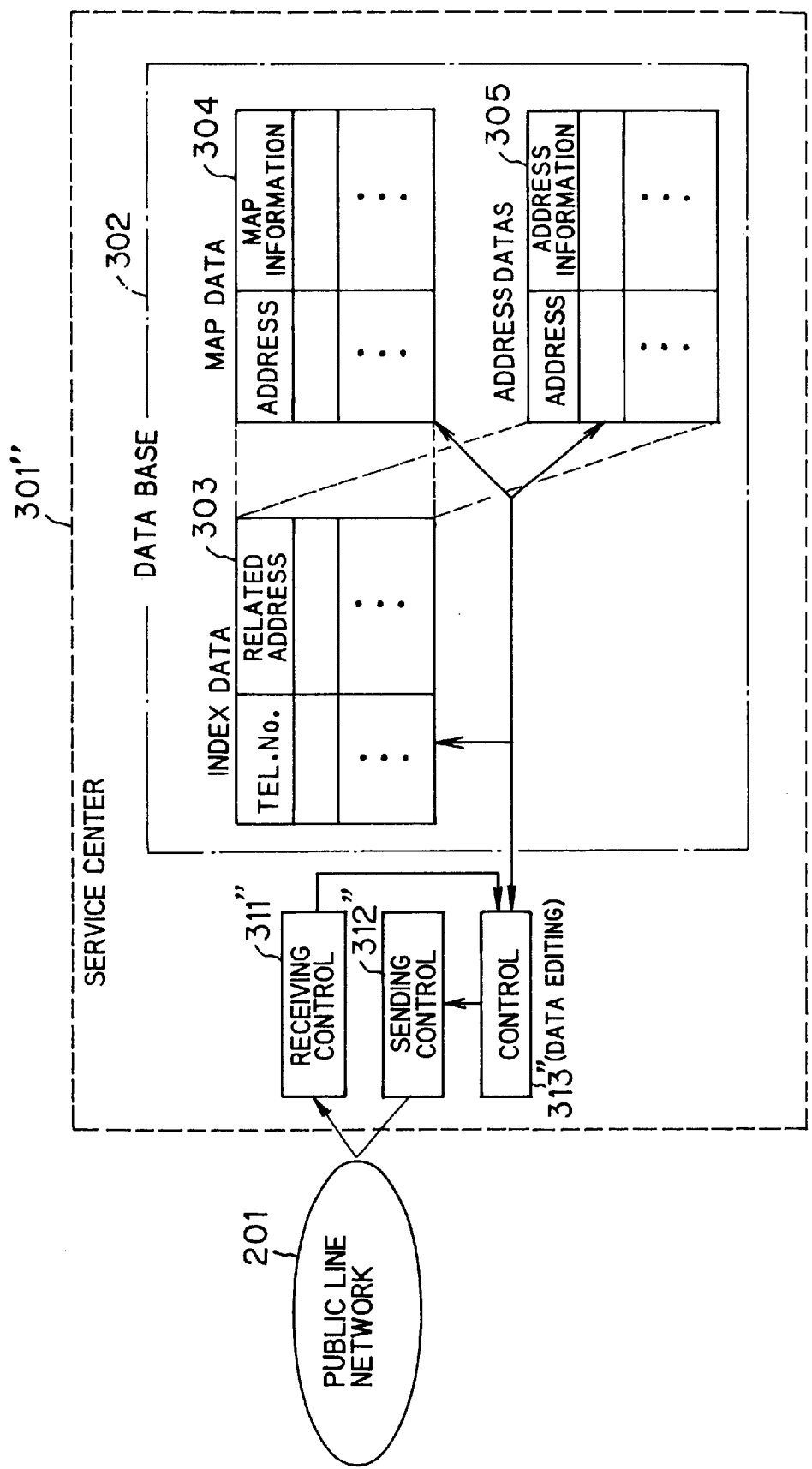
FIG. 13 is a block diagram showing one example of a configuration of a data server which the map information presentation system in FIG. 12 contains.

FIG. 13 shows a detailed configuration of the service center 301".

In FIG. 13, the service center 301" is provided with: a receiving control section 311" for receiving information, such as a telephone number and the like, sent through the public line network 201 from the portable telephone apparatus 101; a control section 313" for extracting from the retrieval database 302 the presentation data about the territory corresponding to the received telephone number to thereby edit it at a predetermined format; and a sending control section 312" for sending the edited presentation data through the public line network 201 to the portable telephone apparatus 101. In this embodiment, one example of the center side receiving device is constituted of the receiving control section 311", and one example of the center side transmitting device is constituted of the control section 313" and the sending control section 312".

The retrieval database 302 contains an index data 303 composed of telephone number information and related address information corresponding to each of the telephone numbers, a map data 304 composed of address information and map information corresponding to each of the addresses, and address data 305 composed of address information and domicile information corresponding to each of the addresses. The index data 303, the map data 304 and the domicile information 305 are correlated with each other by the address information. The map data 304 contains the map data in the various types and various territories, such as map data for a detailed area, map data for a wide area and the like, and further contains the data indicative of detailed information with regard to various facilities, such as a station, a gasoline station, a parking lot, a restaurant and the like indicated on the map data.

The portable telephone apparatus 101 in the third embodiment has the same construction as that shown in FIG. 4 in the first or second embodiment. In the third embodiment especially, the antenna 1 is adapted to send various data to get the information presentation from the service center 301", the RAM 30 is adapted to hold the telephone number data as well as the program etc., and the first RAM 31 is adapted to store the presentation data including the map data received from the service center 301".

Configurations of the LCD device 23 and the key switch 33 in the portable telephone apparatus 101 are further explained with reference to FIG. 14.

Figure 14:
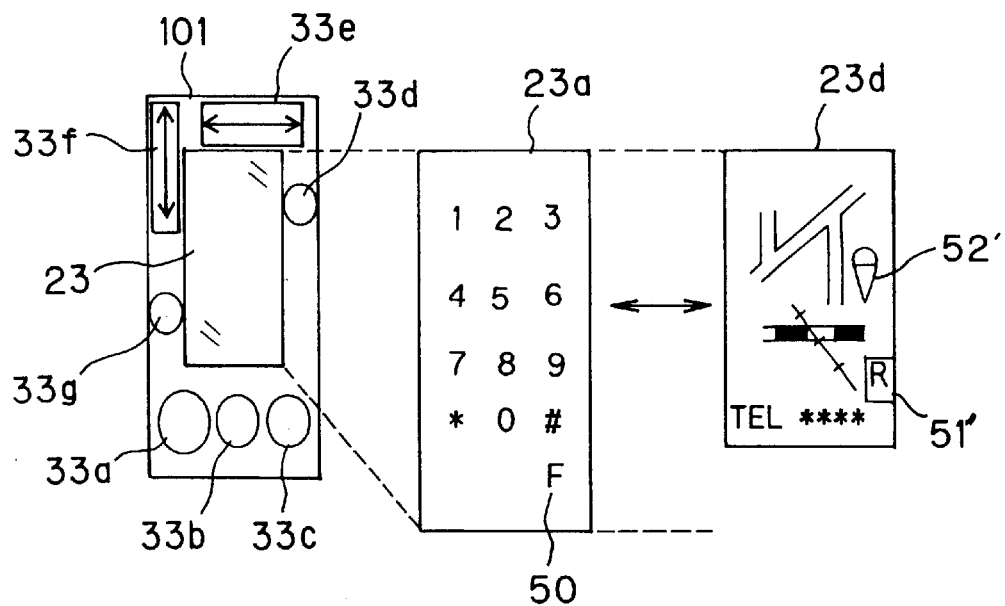
FIG. 14 is a concept diagram showing configurations and operations of an LCD display and a key switch which the portable telephone apparatus in the third embodiment contains.

In FIG. 14, in the third embodiment especially, the scroll key 33e is adapted to scroll the displayed map data in left and right directions on the screen, the scroll key 33f is adapted to scroll the displayed map data in upper and lower directions on the screen, and the marking key 33g is adapted to put a predetermined mark on any position on the map data displayed by the LCD device 23. The LCD driver 22 and the LCD device 23 are constructed such that, as one example of a displaying device, a display is performed as shown in a display screen 23d in FIG. 14 in a map display mode and the map information data transmitted by the data server 301 are displayed. An operation of the "F" key 50 switches from the ten key display mode to the map display mode.

In the map display mode, a telephone number corresponding to the called map is displayed as "TEL*****" on the display screen 23d, in addition to an image indicative of the map. A domicile or address corresponding to this telephone number may be selectively displayed in addition to this telephone number. An "R" key 51' appearing on the display screen 23d is a display mode change key. An operation of the "R" key 51' switches from the map display mode to the ten key display mode. Incidentally, it is also possible to change a program stored in the RAM 30 to thereby employ various display modes, such as a telephone list display mode, a domicile record mode and the like, in addition to these display modes. Moreover, a mark 52' in a form of an ice cream in the display screen 23d indicates a position on the map of a desirable telephone number, and also indicates that an ice cream shop corresponds to this desirable telephone number. Further, in any of the display modes, a telephone number to be called by the telephoning function may be displayed on an appropriate position on the screen, so that the displayed telephone number can be called by actuating the call key 33c, under the above condition.

In this embodiment especially, the CPU 21 controls the radio section so that memory ability information, which indicates a memory ability of the first RAM 31, is further transmitted to the data server 301" through the public line network 201. The editing method for the map information data to be transmitted is suitably changed by the control section 313' of the data server 301". For example, if a memory capacity of the first RAM 31 is not enough for the map data for the territory requested by the telephone number, the map data indicating the detailed town roads may be omitted from a subject of the transmission, or the area for the map data to be transmitted may be reduced, Especially in this embodiment, the selection information representing at least one of area and facility whose map data is desired to be displayed can be inputted by using the LCD display 23, which is now in the ten key display mode, as one example of the input device.

An area whose map data is desired to be displayed is selected by inputting a number on the display screen 23a. For example, a detailed area such as "100 m×100 m" is selected by a key "1", an area including the nearest station is selected by a key "2", a wide area such as "1000 m×1000 m" is selected by a key "4", and no selection is selected by a key "4".

A facility whose map data is desired to be displayed is selected by inputting a number on the display screen 23a. For example, an entire display of all main land marks is selected by the key "1", a display mainly as for restaurants is selected by the key "2", a display mainly as for banks is selected by the key "3", and a situation that a land mark display other than telephone numbers is not necessary is selected by the key "4".

When the selection information indicative of the thus selected area or facility is further transmitted through the public line network 201, the receiving control section 311" of the service center 301" receives this. Then, the control section 313" of the service center 301" suitably edits the presentation data corresponding to the received selection information, and the sending control section 312" sends the thus-edited presentation data to the portable telephone apparatus 101. Hence, in the portable telephone apparatus 101 receiving it, the map data indicative of the desirable area or facility is displayed on the LCD display.

As mentioned above, the control section 313" of the service center 301" changes the manner of editing the transmitted presentation data based on a memory ability of the first RAM 31, the area or facility desired by a user and the like, and edits so as to satisfy the user's desire if possible and effectively utilize the memory ability of the first RAM 31 to the rely transmit at a predetermined format.

Moreover, in this embodiment, after the desirable area is specified o n the display screen of the LCD di splay 23, which is now in the map display mode, by the scroll keys 33e and 33f, the desirable area is stored into the s econd RAm 32 by actuating the memory key 33b.

After the presentation data is stored into the second RAM 32 by the memory key 32b, the user obtains the necessary information by a series of operations. Thus, the line connection to the service center 301 through the public line network 201 may be cut off by the control of the CPU 21. In addition to it or instead of it, the line connection to the service center 301 may be cut off by the control of the CPU 21, if the input of the user through the key switch 33 or the screen of the LCD display 23 is not performed for a predetermined period. Or, the line connection to the portable telephone apparatus 101 may be cut off by the control of the control section 313" on a side of the service center 301", if the receiving control section 311" does not receive a predetermined kind of information from the portable telephone apparatus 101 for a predetermined period. Moreover, the LCD display 23 may continue the display, even after the line connection is cut off as mentioned above. By the above explained configuration, it is advantageous that the user can continue to see on the LCD display 23 the presentation data, such as the read map data and the like, while the utilization periods of the public line network 201 and the service center 301 are shortened.

Next, an operation of the embodiment having the above mentioned configuration is explained with reference to FIGS. 12 to 14.

At first, when the call key 33a of the portable telephone apparatus 101 is pushed by a user, a radio section of the portable telephone apparatus 101 is line-connected to the service center 301" by the control of the CPU 21.

Then, the control information of urging an input instruction for desirable information is sent by the sending control section 312", in the service center 301".

Then, a message of urging the input of the desirable information is displayed on the LCD display 23 by the control of the CPU 21, in the portable telephone apparatus 101. When the user sees it, checks the line connection to the service center 301" and then actuates a telephone number of a territory, whose map data is desired, by using the ten key of the LCD display 23 which is now in the ten key display mode (refer to the display screen 23a in FIG. 14), the inputted telephone number is sent from the radio section through the public line network 201 as the telephone number information together with the memory ability information of the first RAM 31.

In the service center 301", when the control section 313" holds the telephone number information and the memory ability information, the control information of urging the selection instruction about the desired area or facility to be displayed is sent from the sending control section 312", under the control of the control section 313".

Then, in the portable telephone apparatus 101, the message of urging the selection about the desired area or facility to be displayed is displayed on the LCD display 23 under the control of the CPU 21. Then the user sees it and actuates the ten key, which corresponds to the desired area or facility to be displayed as mentioned above, on the LCD display 23 which is now in the ten key display mode, the inputted ten key is transmitted as the selection information indicative of the desired area or facility to be displayed from the radio section through the public line network 201.

Then, in the service center 301", the control section 313" retrieves the retrieval database 302 based on the transmitted selection information or memory ability information to thereby read out the presentation data, such as the map data, the telephone number data, the domicile data and the like, which are requested and shown in FIG. 13. Moreover, it prepares (edition-processes) the presentation data to be transmitted, based on the memory ability information and the selection information. After that, the prepared presentation data is further sent from the sending control section 312" under the control of the control section 313".

Then, in the portable telephone apparatus 101, the received presentation data is once stored in the first RAM 31 under the control of the CPU 21. Consecutively, the display mode is switched to the map display mode (refer to the display screen 23d in FIG. 14), and the map data is displayed on the LCD display 23.

When the user actuates the scroll keys 33e and 33f while looking at the displayed map data, the scroll display is performed on the LCD display 23 under the control of the CPU 21. At this time, if the scroll-indicated portion exceeds a range of the map data stored in the first RAM 31, the CPU 21 requests the map data in the exceeded range as the continuation data to the service center 301".

Then, in the service center 301", the control section 313" retrieves the map data requested by the continuation data and edits again the retrieved map, to thereby send the edited presentation data from the sending control section 312". On the other hand, the line is cut off, if there is no input from the portable telephone apparatus 101 even after an elapse of a predetermined period, after the presentation data is sent.

Then the user actuates the memory key 33b as the occasion demands, the image data on the display screen is stored into the second RAM 32 under the control of the CPU 21. And, the line is cut off, assuming that the necessary information is read in.

Moreover, when the user actuates the call key 33c as the occasion demands, the line connection to the telephone number displayed on the LCD display 23 at that time is established by the control of the CPU 21. On the other hand, when the user actuates the line cutoff key 33d as the occasion demands, the line is forced to be cut off by the control of the CPU 21. When a predetermined time is elapsed under the condition that there is no input through the key switch 33 or the LCD display 23, the line is cut off by the control of the CPU 21.

As mentioned above, according to this embodiment, it is possible to establish the line connection to the service center 301" through the public line network 201 suitably as the occasion demands, without installing a large size of retrieval database to the portable telephone apparatus 101, and then transmit a desirable telephone number to thereby obtain the corresponding presentation data, such as the presentation data and the like. Hence, this is convenient. Moreover, it is very convenient to select a size of an area or a kind of a facility whose display is desired. Furthermore, the presentation data corresponding to the memory ability is transmitted by transmitting the memory ability information of the first RAM 31 to the service center 301". Hence, since a free degree of a performance selection with regard to the first RAM 31 is extremely increased, this is very advantageous in the manufacture and utilization of the apparatus.

Next, a marking function in this embodiment is explained with reference to FIGS. 14 and 15.

Then this marking key 33g is pushed, the CPU 21 actuates a marking mode at which any position on the map data displayed on the LCD display 23 can be specified as a mark position.

Figure 15:
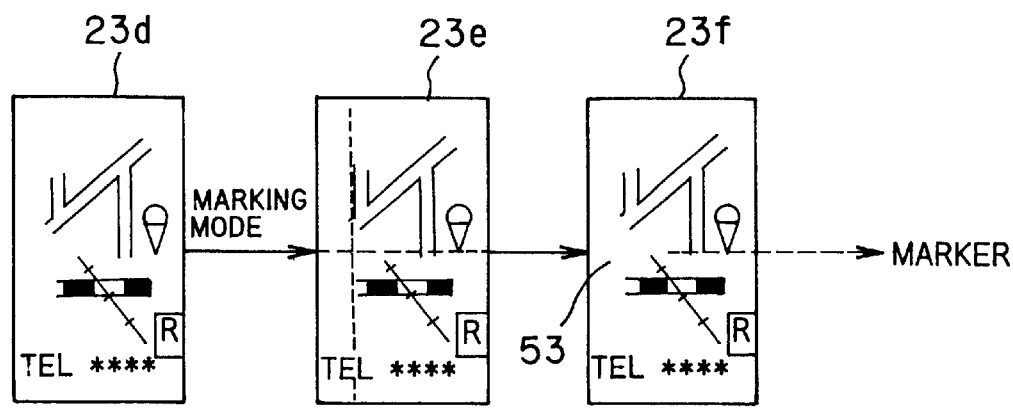
FIG. 15 is a concept diagram showing a display operation by a marking function of the LCD display device which the portable telephone apparatus in the third embodiment contains.

That is, as shown in FIG. 15, when the marking key 33g is pushed at the map display mode of displaying the display screen 23b by using the map data stored in the first RAM 31 or the map data called out by the memory key from the second RAM 32, the marking mode of displaying the display screen 23c is set by the CPU 21. In this marking mode, for example, if a user actuates the scroll keys 33e and 33f, a desirable mark position is set as a central point in cruciform-dashed lines on the display screen 23e. then the marking key 33g is again pushed after this setting, a marker is marked on that point as shown on the display screen 23f. That is, at the set mark position, the LCD display 23 superimposes a mark 53 in a predetermined form on the map data to thereby display it, under the control of the CPU 21. The mark information indicative of the marker is stored into the second RAM 32 together with the map data by actuating the memory key 33b and the like. When the call key 33c is pushed by the user as the occasion demands under the condition of the display screen 23f on which the mark 53 is displayed, the radio section establishes the line connection to the telephone number displayed on a lower portion of the display screen 23f, by the control of the CPU 21.

By preparing a plurality of portable telephone apparatuses 101 constituted in the above explained manner, the mark information correlated with the map data is transmitted between the portable telephone apparatuses through the public line network 201. Moreover, if the LCD display 23 displays the mark 53 on the map data based on the received mark information under the control of the CPU 21, it is possible to transmit to each other any position on the map correlated with the map through the public line network 201.

Considering that the marking operation is completed, the user pushes the "R" key for the mode change, and then the operation flow returns to the ten key display mode of displaying the display screen 23a shown in FIG. 14.

According to this marking function, for example, since a waiting place can be transmitted as the mark 53 indicated on the map, it is possible to indicate any position on the map to a partner to visually transmit it. Hence, this is very convenient in a practical utility.

Next, a linking function of linking the call in this embodiment with the map data display stored in the second RAM 32 is explained with reference to FIGS. 14 and 16.

Figure 16:
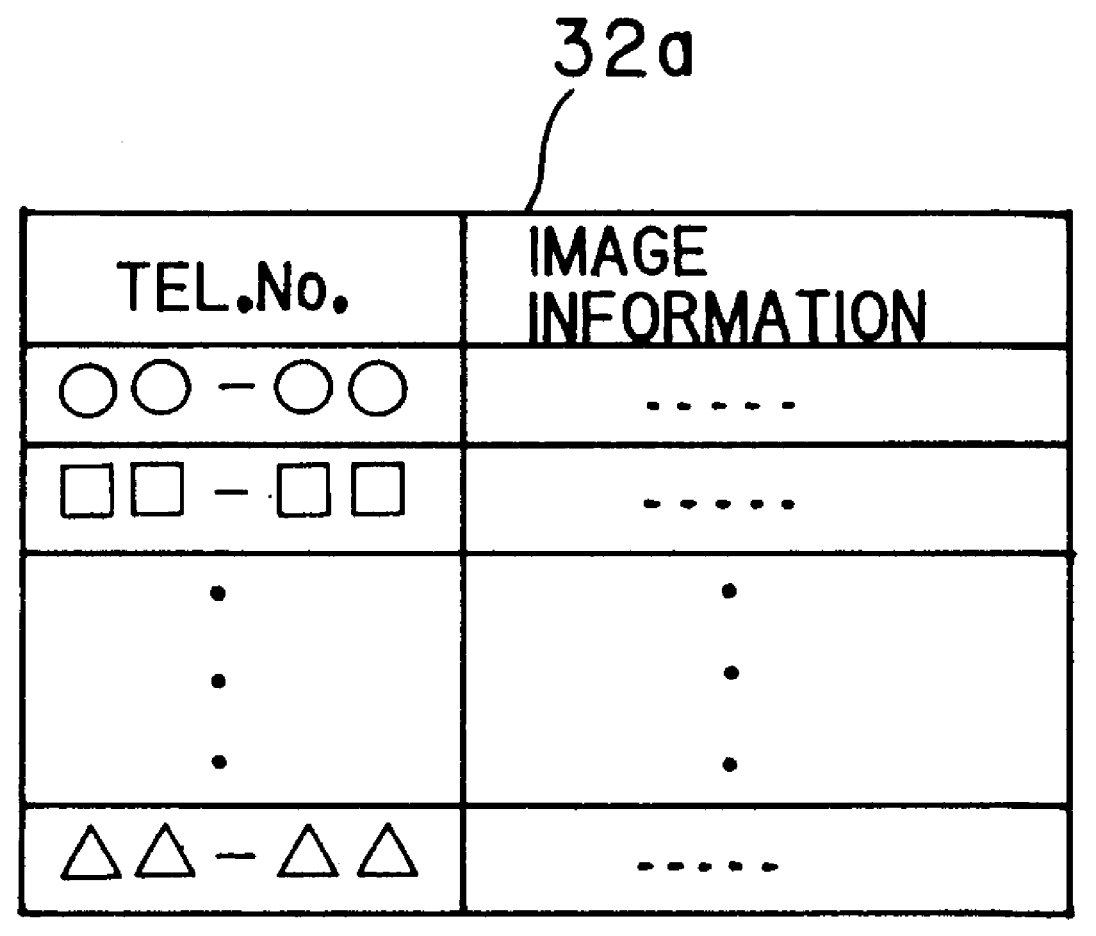

Especially in this embodiment, as shown in FIG. 16, a telephone number and image information indicative of the map data corresponding to the telephone number are stored in the second RAM 32, in a form of data 32a in which they are correlated with each other. Then the call key 33c shown in FIG. 14 is pushed by the user as the occasion demands, the CPU 21 as one example of a judging device judges whether or not a telephone number identical to the calling telephone number is stored in the second RAM 32. If the CPU 21 judges that the identical telephone number is stored, the LCD display 23 performs the switching operation between the display modes when calling, and then the line connection is established while the map data corresponding to the telephone number is displayed. If the CPU 21 judges that the identical telephone number is not stored, the line connection is established while maintaining the display screen when calling, without performing the switching operation between the display modes when calling.

According to this linking function, when calling the desirable telephone number, if the map data corresponding thereto is already stored in the second RAM 32, the map data can be called out therefrom in conjunction with the call. Hence, the operability is very excellent.

In case that a communication enterprise offers a call number representation service, since a telephone number on a calling side is informed at a time of an incoming call, it is possible to set such that the presentation data is directly requested to the service center.

In the above mentioned first to third embodiments, the portable telephone apparatus is explained as one example of the portable communication terminal apparatus. However, the present invention can be applied to a PHS (Personal Handyphone System), an electronic memo or note type personal computer having a modem, a portable apparatus dedicated to display the stock information data or the sport information data and the like, instead of the portable telephone apparatus.

The display of the stock information data, the display of the sport information data and the map information data are differently explained in the first to third embodiments. However, another configuration is allowable in which one portable telephone apparatus has two modes or three modes of the stock information display mode, the sport information display mode and map information display mode, and either one of displays in these modes is suitably performed in accordance with the desire of the user.

Moreover, the provided service is not limited to the stock information data, the sport information data and the map information data. Then, it can spread to variously financial information, industrial information, educational information, recreation information and the like, which are specified through the communication line.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An information presentation system comprising:

a data server for providing information data classified into a plurality of preset data groups through a communication line; and a portable communication terminal apparatus connectable through said communication line to said data server, said portable communication terminal apparatus comprising:
 a connecting device for connecting said portable communication terminal apparatus to said data server through said communication line;
 an input device for inputting or specifying a desirable code before receiving any prompt code from said data server, the desirable code selected from among a plurality of data group codes each indicating a respective one of the preset data groups; and
 a terminal side transmitting device for transmitting the inputted or specified code through said communication line to said data server, said data server comprising:
 a server side receiving device for receiving the transmitted code; and
 a server side transmitting device for transmitting the information data for the data group corresponding to the received code from said data server to said portable communication terminal apparatus through said communication line in a predetermined format without transmitting any prompt code to said portable communication terminal apparatus, said portable communication terminal apparatus further comprising:
 a terminal side receiving device for receiving the transmitted information data;
 a first memory device for storing the received information data; and
 a displaying device for displaying the stored information data,
 wherein
  said terminal side transmitting device further transmits memory ability information indicative of a memory ability of said first memory device to said data server through said communication line, after establishing the connection through said communication line,
  said server side receiving device further receives the transmitted memory ability information, and
  said server side transmitting device adjusts an amount of the information data to be transmitted on the basis of the memory ability indicated by the received memory ability information such that, if the memory ability of said first memory is not enough to store detailed information included in the information data corresponding to the received code, said server side transmitting device transmits basic information included in the information data but does not transmit the detailed information, and that, if the memory ability of said first memory is enough to store the detailed information, said server side transmitting device transmits the detailed information as well as the basic information.

2. An information presentation system according to claim 1, wherein:

the information data is stock information data, the data group is a group for each classified industry division, and the data group code is an industry division code indicative of each of industry divisions;

said input device is adapted to input or specify at least one desirable code of the industry division code and a plurality of classified company stock codes each indicating respective one of preset companies; and said server side transmitting device transmits the stock information data as for the company corresponding to the code inputted or specified by said input device by a predetermined format from said data server to said portable communication terminal apparatus through said communication line.

3. An information presentation system according to claim 2, wherein:

said data server further comprises a plurality of classified division databases, each of which stores respective one of the data groups classified into the industry divisions and to which respectively different telephone numbers are assigned;

said input device is adapted to input or specify at least one desirable code of the industry division code and the classified company stock code before establishing a connection through said communication line; and said connecting device connects said portable communication terminal apparatus to one of said classified division databases as for the industry division corresponding to the inputted or specified code through said communication line.

4. An information presentation system according to claim 2, wherein:

said portable communication terminal apparatus further comprises a second memory device for storing company name data corresponding to each of the classified company stock codes; and said displaying device refers to the stored company name data and displays the stock information data together with the company name data corresponding to the displayed stock information data.

5. An information presentation system according to claim 1, wherein:

said input device is adapted to specify the information data stored in said first memory device; and said displaying device displays the information data specified by said input device.

6. An information presentation system comprising:

a data server for providing information data classified into a plurality of preset data groups through a communication line; and a portable communication terminal apparatus connectable through said communication line to said data server, said portable communication terminal apparatus comprising:

a connecting device for connecting said portable communication terminal apparatus to said data server through said communication line;

an input device for inputting or specifying a desirable code before receiving any prompt code from said data server, the desirable code selected from among a plurality of data group codes each indicating a respective one of the preset data groups; and a terminal side transmitting device for transmitting the inputted or specified code through said communication line to said data server, said data server comprising:

a server side receiving device for receiving the transmitted code; and a server side transmitting device for transmitting the information data for the data group corresponding to the received code from said data server to said portable communication terminal apparatus through said communication line in a predetermined format without transmitting any prompt code to said portable communication terminal apparatus, said portable communication terminal apparatus further comprising:

a terminal side receiving device for receiving the transmitted information data;

a first memory device for storing the received information data; and a displaying device for displaying the stored information data, wherein said first memory device has a memory ability to store more information data in data amount than the information data which said displaying device can display at one time, said input device is adapted to specify a portion to be scroll-displayed among the information data with respect to said displaying device, said displaying device scroll-displays the portion specified by said input device among the stored information data, and if said input device specifies one portion of the information data to be scroll-displayed, which exceeds a range of the stored information data, while said displaying device is scroll displaying the information data, said terminal side transmitting device transmits a request for the specified one portion of the information data to said data server, and then said displaying device scroll-displays the specified one portion of the information data received from said data server in response to the request.

7. An information presentation system according to claim 6, wherein:

the information data is stock information data, the data group is a group for each classified industry division, and the data group code is an industry division code indicative of each of industry divisions;

said input device is adapted to input or specify at least one desirable code of the industry division code and a plurality of classified company stock codes each indicating respective one of preset companies; and said server side transmitting device transmits the stock information data as for the company corresponding to the code inputted or specified by said input device by a predetermined format from said data server to said portable communication terminal apparatus through said communication line.

8. An information presentation system according to claim 7, wherein:

said data server further comprises a plurality of classified division databases, each of which stores respective one of the data groups classified into the industry divisions and to which respectively different telephone numbers are assigned;

said input device is adapted to input or specify at least one desirable code of the industry division code and the classified company stock code before establishing a connection through said communication line; and said connecting device connects said portable communication terminal apparatus to one of said classified division databases as for the industry division corresponding to the inputted or specified code through said communication line.

9. An information presentation system according to claim 7, wherein:

said portable communication terminal apparatus further comprises a second memory device for storing company name data corresponding to each of the classified company stock codes; and said displaying device refers to the stored company name data and displays the stock information data together with the company name data corresponding to the displayed stock information data.

10. An information presentation system according to claim 6, wherein:

said input device is adapted to specify the information data stored in said first memory device; and said displaying device displays the information data specified by said input device.

11. A portable telephone apparatus with an information displaying function connectable to a data server through a communication line, said data server providing information data classified into a plurality of preset data groups by transmitting the information data in the data group corresponding to a received code without transmitting any prompt code to said portable telephone apparatus, wherein the received code is selected from a plurality of data group codes each indicating a respective one of the data groups, said portable telephone apparatus comprising:

a connecting device for connecting said portable telephone apparatus to said data server through said communication line;

an input device for inputting or specifying a desirable code from among the plurality of data group codes before receiving any prompt code from said data server;

a terminal side transmitting device for transmitting the inputted or specified code through said communication line to said data server;

a terminal side receiving device for receiving the transmitted information data transmitted by said data server in correspondence with the received code, through said communication line;

a first memory device for storing the received information data; and a displaying device for displaying the stored information data, wherein said first memory device has a memory ability to store more information data in data amount than the information data which said displaying device can display at one time, said input device is adapted to specify a portion to be scroll-displayed among the information data with respect to said displaying device, said displaying device scroll-displays the portion specified by said input device among the stored information data, and if said input device specifies one portion of the information data to be scroll-displayed, which exceeds a range of the stored information data, while said displaying device is scroll-displaying the information data, said terminal side transmitting device transmits a request for the specified one portion of the information data to said data server, and then said displaying device scroll-displays the specified one portion of the information data received from said data server in response to the request.

12. A portable telephone apparatus according to claim 11, wherein:

the information data is stock information data, the data group is a group for each classified industry division, and the data group code is an industry division code indicative of each of industry divisions;

said input device is adapted to input or specify at least one desirable code of the industry division code and a plurality of classified company stock codes each indicating respective one of preset companies; and said data server transmits the stock information data as for the company corresponding to the code inputted or specified by said input device to said portable telephone apparatus through said communication line.

13. A portable telephone apparatus according to claim 12, wherein:

said portable telephone apparatus further comprises a second memory device for storing company name data corresponding to each of the classified company stock codes; and said displaying device refers to the stored company name data and displays the stock information data together with the company name data corresponding to the displayed stock information data.

14. An information presentation system comprising:

a data server for providing information data classified into a plurality of preset data groups through a communication line and a portable communication terminal apparatus connectable through said communication line to said data server, said portable communication terminal apparatus comprising:

a connecting device for connecting said portable communication terminal apparatus to said data server through said communication line;

an input device for inputting or specifying a desirable code selected from among a plurality of data group codes each indicating a respective one of the preset data groups; and a terminal side transmitting device for transmitting the inputted or specified code through said communication line to said data server, said data server comprising:

a server side receiving device for receiving the transmitted code; and a server side transmitting device for transmitting the information data for the data group corresponding to the received code from said data server to said portable communication terminal apparatus through said communication line in a predetermined format, said portable communication terminal apparatus further comprising:

a terminal side receiving device for receiving the transmitted information data:

a first memory device for storing the received information data; and a displaying device for displaying the stored information data, wherein
said terminal side transmitting device further transmits memory ability information indicative of a memory ability of said first memory device to said data server through said communication line after establishing the connection through said communication line,
said server side receiving device further receives the transmitted memory ability information, and
said server side transmitting device adjusts an amount of the information data to be transmitted on the basis of the memory ability indicated by the received memory information ability such that, if the memory ability of said first memory is not enough to store detailed information included in the information data corresponding to the received code, said server side transmitting device transmits basic information included in the information data but does not transmit the detailed information, and that, if the memory ability of said first memory is enough to store the detailed information, said server side transmitting device transmits the detailed information as well as the basic information.

15. An information presentation system comprising:
a data server for providing information data classified into a plurality of present data groups through a communication line and a portable communication terminal apparatus connectable through said communication line to said data server,
said portable communication terminal apparatus comprising:
   a connecting device for connecting said portable communication terminal apparatus to said data server through said communication line;
   an input device for inputting or specifying a desirable code selected from among a plurality of data group codes each indicating a respective one of the preset data groups; and
   a terminal side transmitting device for transmitting the inputted or specified code through said communication line to said data server,
said data server comprising:
   a server side receiving device for receiving the transmitted code; and
   a server side transmitting device for transmitting the information data for the data group corresponding to the received code from said data server to said portable communication terminal apparatus through said communication line in a predetermined format,
said portable communication terminal apparatus further comprising:
   a terminal side receiving device for receiving the transmitted information data;
   a first memory device for storing the received information data; and
   a displaying device for displaying the stored data,
wherein
said first memory device has a memory ability to store more information data in data amount than the information data which said displaying device can display at one time,
said input device is adapted to specify a portion to be scroll-displayed among the information data with respect to said displaying device,
said displaying device scroll-displays the portion specified by said input device among the stored information data, and
if said input device specifies one portion of the information data to be scroll-displayed, which exceeds a range of the stored information data, while said displaying device is scroll-displaying the information data, said terminal side transmitting device transmits a request for the specified one portion of the information data to said data server, and then said displaying device scroll-displays the specified one portion of the information data received from said data server in response to the request.

16. A data server for providing information data classified into a plurality of preset data groups through a communication line to a portable communication terminal apparatus, said data server comprising:
   a server side receiving device for receiving a transmitted code selected from among a plurality of data group each indicating a respective one of the preset data by said portable communication terminal apparatus: and
   a server side transmitting device for transmitting the information data for the data group corresponding to the received code from said data server to said portable communication terminal apparatus through said communication line in a predetermined format,
wherein
said server side receiving device further receives transmitted memory ability information indicative of a memory ability of said portable communication terminal apparatus through said communication line, and
said server side transmitting device adjusts an amount of the information data to be transmitted on the basis of the memory ability indicated by the received memory ability information such that, if the memory ability of said portable communication terminal apparatus is not enough to store detailed information included in the information data corresponding to the received code, said server side transmitting device transmits basic information included in the information data but does not transmit the detailed information, and that, if the memory ability of said portable communication terminal apparatus is enough to store the detailed information, said server side transmitting device transmits the detailed information as well as the basic information.

* * * * *